(12) United States Patent
Kazawa et al.

(10) Patent No.: US 8,724,995 B2
(45) Date of Patent: May 13, 2014

(54) PASSIVE OPTICAL NETWORK SYSTEM AND OPERATING METHOD THEREOF

(75) Inventors: Tohru Kazawa, Kokubunji (JP);
Akihiko Tsuchiya, Fujisawa (JP);
Norihiro Sakamoto, Chigasaki (JP);
Yusuke Yajima, Fujisawa (JP);
Masatoshi Takihiro, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 110 days.

(21) Appl. No.: 13/201,804

(22) PCT Filed: Nov. 9, 2009

(86) PCT No.: PCT/JP2009/069051
§ 371 (c)(1),
(2), (4) Date: Sep. 23, 2011

(87) PCT Pub. No.: WO2010/116561
PCT Pub. Date: Oct. 14, 2010

(65) Prior Publication Data
US 2012/0008948 A1 Jan. 12, 2012

(30) Foreign Application Priority Data
Mar. 30, 2009 (JP) .................................. 2009-080861

(51) Int. Cl.
*H04B 10/00* (2013.01)
(52) U.S. Cl.
USPC ............................. 398/72; 398/154; 398/155
(58) Field of Classification Search
USPC ..................................... 398/66–73, 154, 155
See application file for complete search history.

(56) References Cited

U.S. PATENT DOCUMENTS 7,143,307 B1  11/2006  Witte et al.
7,272,315 B1 *  9/2007  Au et al. ........................ 398/63
(Continued)

FOREIGN PATENT DOCUMENTS

JP  2003-348109 A  12/2003
JP  2006-262109     9/2006
(Continued)

OTHER PUBLICATIONS

Gigabit-capable Passive Optical Networks (G-PON): Transmission convergence layer specification; Recommendation ITU-T G.984.3; Mar. 2008; pp. i-ii; 5-135.

(Continued)

*Primary Examiner* — Agustin Bello
(74) *Attorney, Agent, or Firm* — Foley & Lardner LLP

(57) ABSTRACT

Provided is a passive optical network system for operating a mixture of PONs with differing transmission speeds and is capable of reducing power consumption on the basis of the amount of signals being transmitted. The master station of the passive optical network system, which determines the amount and timing of signals sent thereto by each of a plurality of slave stations on the basis of the requests of the plurality of slave stations and receives signals from the plurality of slave stations via an optical fiber network, is equipped with a control unit that determines in each set cycle the amount, transmission timing, and transmission speed of the signals that each slave station is permitted to transmit to said master station on the basis of the amount of signals that each of the plurality of slave stations has requested to transmit, and that notifies such to each slave station. Additionally, each of the plurality of slave stations is equipped with a control unit that transmits signals to the master station at a first transmission speed or a second transmission speed that is faster than the first transmission speed, and is configured to transmit signals with either the first transmission speed or the second transmission speed on the basis of notifications from the master station.

7 Claims, 21 Drawing Sheets

(56) References Cited

U.S. PATENT DOCUMENTS

| | | | |
|---|---|---|---|
| 7,787,771 B2 * | 8/2010 | Kim et al. | 398/68 |
| 8,233,795 B2 * | 7/2012 | Lee et al. | 398/51 |
| 8,244,130 B2 * | 8/2012 | Shi et al. | 398/67 |
| 8,315,520 B2 * | 11/2012 | Zou | 398/67 |
| 8,331,784 B2 * | 12/2012 | Mizutani et al. | 398/70 |
| 8,346,083 B2 * | 1/2013 | Murayama et al. | 398/72 |
| 2001/0037473 A1 | 11/2001 | Matsuura et al. | |
| 2004/0172574 A1 | 9/2004 | Wing et al. | |
| 2006/0211428 A1 | 9/2006 | Shuto | |
| 2008/0016387 A1 | 1/2008 | Bensinger | |
| 2008/0126834 A1 | 5/2008 | Sankaran et al. | |
| 2009/0010650 A1 | 1/2009 | Tsuchiya et al. | |
| 2009/0034964 A1 | 2/2009 | Sakai et al. | |

FOREIGN PATENT DOCUMENTS

| | | |
|---|---|---|
| JP | 2007-288655 A | 11/2007 |
| JP | 2009-016925 A | 1/2009 |
| JP | 2009-017324 | 1/2009 |

OTHER PUBLICATIONS

PCT International Search Report and Written Opinion on application No. PCT/JP2009/069051 dated Jan. 12, 2010.

PCT International Search Report on application No. PCT/JP2010/007324 mailed Sep. 30, 2011; 4 pages.

* cited by examiner

802

(a) 901, 902

| ONU-ID | BYTE LENGTH |
|---|---|
| 1 | 20000 |
| 2 | 1000 |
| 3 | 30000 |
| 4 | 2000 |
| 5 | 10000 |

SUM OF ASSIGNED BYTES = 63000

(b)

| ONU-ID | BYTE LENGTH |
|---|---|
| 1 | 40000 |
| 2 | 10000 |
| 3 | 60000 |
| 4 | 10200 |
| 5 | 20000 |

SUM OF ASSIGNED BYTES = 1420200

(c)

| ONU-ID | BYTE LENGTH |
|---|---|
| 1 | 90000 |
| 2 | 10000 |
| 3 | 90000 |
| 4 | 10000 |
| 5 | 50000 |

SUM OF ASSIGNED BYTES = 250000

(d)

| ONU-ID | BYTE LENGTH |
|---|---|
| 1 | 200000 |
| 2 | 10000 |
| 3 | 10000 |
| 4 | 200000 |
| 5 | 40000 |

SUM OF ASSIGNED BYTES = 460000

(e)

| ONU-ID | BYTE LENGTH |
|---|---|
| 1 | 200000 |
| 2 | 30000 |
| 3 | 200000 |
| 4 | 30000 |
| 5 | 100000 |

SUM OF ASSIGNED BYTES = 560000

| ONU-ID | Start | End | RATE | |
|---|---|---|---|---|
| 1 | 12 | 19439 | 1G | FIRST GRANT CYCLE |
| 1 | 12 | 583 | 1G | SECOND GRANT CYCLE |
| 2 | 596 | 1595 | 1G | |
| 3 | 1608 | 19439 | 1G | |
| 3 | 12 | 12179 | 1G | THIRD GRANT CYCLE |
| 4 | 12192 | 14191 | 1G | |
| 5 | 14203 | 19439 | 1G | |
| 5 | 12 | 4774 | 1G | FOURTH GRANT CYCLE |

(b)

| ONU-ID | Start | End | RATE | |
|---|---|---|---|---|
| 2 | 12 | 10011 | 1G | FIRST GRANT CYCLE |
| 3 | 10024 | 19439 | 1G | |
| 3 | 12 | 19439 | 1G | SECOND GRANT CYCLE |
| 3 | 12 | 19439 | 1G | THIRD GRANT CYCLE |
| 3 | 12 | 1477 | 10G | |
| 4 | 1490 | 2764 | 10G | |
| 5 | 2777 | 5276 | 10G | |
| 1 | 5289 | 10288 | 10G | FOURTH GRANT CYCLE |

(c)

| ONU-ID | Start | End | RATE | |
|---|---|---|---|---|
| 3 | 12 | 19439 | 1G | FIRST GRANT CYCLE |
| 3 | 12 | 19439 | 1G | SECOND GRANT CYCLE |
| 3 | 12 | 6404 | 10G | |
| 4 | 6417 | 6541 | 10G | THIRD GRANT CYCLE |
| 5 | 6554 | 12803 | 10G | |
| 1 | 12816 | 18438 | 10G | |
| 1 | 12 | 4637 | 10G | FOURTH GRANT CYCLE |
| 2 | 4650 | 4774 | 10G | |

(d)

| ONU-ID | Start | End | RATE | |
|---|---|---|---|---|
| 4 | 12 | 19439 | 1G | FIRST GRANT CYCLE |
| 4 | 12 | 19439 | 10G | SECOND GRANT CYCLE |
| 4 | 12 | 3155 | 10G | |
| 5 | 3168 | 8167 | 10G | THIRD GRANT CYCLE |
| 1 | 8180 | 19439 | 10G | |
| 1 | 12 | 13761 | 10G | FOURTH GRANT CYCLE |
| 2 | 13774 | 13898 | 10G | |

(e)

| ONU-ID | Start | End | RATE | |
|---|---|---|---|---|
| 5 | 12 | 12511 | 10G | FIRST GRANT CYCLE |
| 1 | 12524 | 19439 | 10G | |
| 2 | 18108 | 18482 | 10G | SECOND GRANT CYCLE |
| 3 | 18495 | 19493 | 10G | THIRD GRANT CYCLE |
| 3 | 12 | 4638 | 10G | FOURTH GRANT CYCLE |
| 4 | 4651 | 5025 | 10G | |

| ONU-ID | BYTE LENGTH |
|---|---|
| 2 | 1000 |
| 4 | 2000 |
| 5 | 10000 |
| 1 | 20000 |
| 3 | 30000 |

SUM OF ASSIGNED BYTES = 63000

(b)

| ONU-ID | BYTE LENGTH |
|---|---|
| 2 | 10000 |
| 4 | 10200 |
| 5 | 20000 |
| 1 | 40000 |
| 3 | 60000 |

SUM OF ASSIGNED BYTES = 1420200

(c)

| ONU-ID | BYTE LENGTH |
|---|---|
| 2 | 10000 |
| 4 | 10000 |
| 5 | 50000 |
| 1 | 90000 |
| 3 | 90000 |

SUM OF ASSIGNED BYTES = 250000

(d)

| ONU-ID | BYTE LENGTH |
|---|---|
| 2 | 10000 |
| 3 | 10000 |
| 5 | 40000 |
| 1 | 200000 |
| 4 | 200000 |

SUM OF ASSIGNED BYTES = 460000

(e)

| ONU-ID | BYTE LENGTH |
|---|---|
| 2 | 30000 |
| 4 | 30000 |
| 5 | 100000 |
| 1 | 200000 |
| 3 | 200000 |

SUM OF ASSIGNED BYTES = 560000

(a)

| ONU-ID | Start | End | RATE |
|---|---|---|---|
| 2 | 12 | 1011 | 1G |
| 4 | 1024 | 3023 | 1G |
| 5 | 3036 | 13035 | 1G |
| 1 | 13048 | 19439 | 1G |
| 1 | 12 | 13619 | 1G |
| 3 | 13632 | 19439 | 1G |
| 3 | 12 | 19439 | 1G |
| 3 | 12 | 4775 | 1G |

FIRST GRANT CYCLE / SECOND GRANT CYCLE / THIRD GRANT CYCLE / FOURTH GRANT CYCLE (b)

| ONU-ID | Start | End | RATE |
|---|---|---|---|
| 2 | 12 | 10011 | 1G |
| 4 | 10024 | 19439 | 1G |
| 4 | 12 | 795 | 1G |
| 5 | 808 | 19439 | 1G |
| 5 | 12 | 1380 | 1G |
| 1 | 1393 | 19439 | 1G |
| 1 | 12 | 2756 | 10G |
| 3 | 2769 | 10268 | 10G |

(c)

| ONU-ID | Start | End | RATE |
|---|---|---|---|
| 2 | 12 | 10011 | 1G |
| 4 | 10024 | 19439 | 1G |
| 4 | 12 | 597 | 1G |
| 5 | 610 | 19439 | 1G |
| 5 | 12 | 3908 | 10G |
| 1 | 3921 | 15170 | 10G |
| 3 | 15183 | 19439 | 10G |
| 3 | 12 | 7004 | 10G |

(d)

| ONU-ID | Start | End | RATE |
|---|---|---|---|
| 2 | 12 | 10011 | 1G |
| 3 | 10024 | 19439 | 1G |
| 3 | 12 | 83 | 10G |
| 5 | 96 | 5095 | 10G |
| 1 | 5108 | 19439 | 10G |
| 1 | 12 | 5188 | 10G |
| 4 | 5131 | 19438 | 10G |
| 4 | 12 | 10702 | 10G |

(e)

| ONU-ID | Start | End | RATE |
|---|---|---|---|
| 2 | 12 | 3761 | 10G |
| 4 | 3774 | 7523 | 10G |
| 5 | 7536 | 19439 | 10G |
| 1 | 12 | 607 | 10G |
| 1 | 620 | 19493 | 10G |
| 3 | 12 | 6191 | 10G |
| 3 | 6204 | 19739 | 10G |
| 3 | 12 | 11775 | 10G |

FIG.15

| ONU-ID 901 | Start 1002 | End 1003 | TRANSMISSION RATE 1004 | PERMITTED BYTES (1GB) 1005 | HIGH-PRIORITY QUEUE LENGTH 1006 | LOW-PRIORITY QUEUE LENGTH 1007 | TRANSMISSION RATE 1008 |
|---|---|---|---|---|---|---|---|
| 5 | 12 | 12511 | 10G | 12500 | 10000 | 90000 | 1G |
| 1 | 12524 | 19439 | 10G | 25000 | 50000 | 150000 | 10G |
| 1 | 12 | 18095 | 10G | | | | 10G |
| 2 | 18108 | 18482 | 10G | 375 | 200 | 2800 | 1G |
| 3 | 18495 | 19439 | 10G | 25000 | 30000 | 170000 | 10G |
| 3 | 12 | 4638 | 10G | | | | 10G |
| 4 | 4651 | 5025 | 10G | 375 | 2000 | 1000 | 10G |

FIG.20

PASSIVE OPTICAL NETWORK SYSTEM AND OPERATING METHOD THEREOF

TECHNICAL FIELD

The present invention relates to passive optical network systems, optical line terminators, and optical network units, and more specifically, to a passive optical network system in which a plurality of subscriber terminals share an optical transmission line.

BACKGROUND ART

The trend to increase the speed and bandwidth of communication networks has grown also in subscriber access networks, and passive optical network systems (PONs) stipulated by Recommendations G984.3 and the like of Telecommunication Standardization Sector of the International Telecommunication Union (ITU-T) have been introduced. The PON is a system that connects an optical line terminator (OLT) connected to an upper communication network and an optical network unit (ONU) serving a plurality of subscriber terminals (PCs and telephones) by a passive optical network that includes a trunk optical fiber, an optical splitter, and a plurality of branch optical fibers. More specifically, communication is conducted as follows: Signals from the terminals (such as a PC) connected to each ONU sent as optical signals through the branch optical fibers pass an optical splitter, are optically (time division) multiplexed on the trunk optical fiber, and are sent to the OLT; and the OLT performs communication processing of the signals from the ONUs and send the signals to the upper communication network or to another ONU connected to the OLT.

In the early period, PON systems that handle signals at a low speed such as 64 kbps were introduced. Broadband PONs (BPONs) that send and receive fixed-length ATM cells at about 600 Mbps at a maximum, Ethernet PONs (EPONs) that send and receive variable-length Ethernet (registered trademark, the indication of the registered trademark will be omitted below) packets at 1 Gbps at a maximum, and gigabit-capable PONs (GPONs) that can handle signals at a faster speed of about 2.4 Gbps have been introduced. A high-speed PON that can handle signals at a rate ranging from 10 Gbps to 40 Gbps will be demanded in the future. As a means for implementing those high-speed PONs, use of time division multiplexing (TDM) as used in the current PONs is considered. The current PONs that use TDM use different wavelengths for the upstream signal (from the ONU to the OLT) and the downstream signal (from the OLT to the ONU), and communication between the OLT and the ONUs is implemented by assigning communication time slots to the ONUs. More specifically, a variable-length burst signal, which can be easily applied to a variety of signals (such as sound, image, and data), is assigned.

In the PONs described above, the ONUs are disposed in scattered subscriber's places, and the ONUs are at different distances from the OLT. The variety of lengths (transmission distances) of the optical fibers that include the trunk optical fiber and the branch optical fibers between the OLT and the ONUs cause variations in transmission delay (delay amount) between the ONUs and the OLT. Even if the ONUs send signals at different timings, the optical signals from the ONUs may collide or interfere with one another on the trunk optical fiber. Accordingly, the PONs use the ranging technique stipulated in the ITU-T Recommendation G984.3, for example, to measure the distances between the OLT and the ONUs and adjust the delay of signals output from the ONUs so that the output signals will not collide with one another. The OLT determines the bandwidth of a signal that the ONU is permitted to send, by using the dynamic bandwidth assignment (DBA) technique, in accordance with transmission requests from the ONUs, and specifies the transmission timings of the ONUs such that the optical signals from the ONUs will not collide or interfere with one another on the trunk optical fiber, taking the delay amount measured by ranging into consideration. The PONs are configured to perform communication by managing the timings of signal transmission and reception between the OLT and the ONUs in the system.

In the GPON, in order to allow the OLT to identify and process the signals sent from the ONUs and multiplexed on the trunk optical fiber, the transmission signal from each ONU begins with a guard time of up to 12 bytes provided to prevent interference; a burst overhead that includes a preamble used to determine a signal identification threshold of a receiver in the OLT and to extract the clock and a delimiter that identifies a boundary of a received signal; and a PON control signal (sometimes called an overhead or a header), preceding data (sometimes called a payload). The data is variable-length burst data and begins with a GPON encapsulation method (GEM) header, which is used to process the variable-length data.

The signal sent from the OLT to each ONU includes time-division-multiplexed data addressed to the ONU, preceded by a frame synchronization pattern for identifying the beginning, a PLOAM field for sending monitoring, maintenance, and control information, an overhead (sometimes called a header), or a grant indication field for indicating the timing of signal transmission to the ONU, so that each ONU can identify and process the signal from the OLT. Like the signal from the ONU, the multiplexed data addressed to the ONU includes a GEM header for variable-length data processing. The OLT determines upstream transmission timings (start timing (Start) and end timing (Stop)) of each ONU in bytes and gives the information to the ONU by using the grant indication field. The given transmission timing is called a grant. When each ONU sends data addressed to the OLT at the given permitted timing, the data is optically (time division) multiplexed on the optical fiber and is received by the OLT.

RELATED ART DOCUMENTS

Non-Patent Documents

Non-patent document 1: ITU-T Recommendation G.984.3

DISCLOSURE OF INVENTION

Problems to be Solved by the Invention

As symbolized by the shift from BPON to GPON, PONs that can process faster signals have been developed and introduced. It is known that optical modules and chips that implement the signal transmission function of the PON consume more power at a higher transmission rate. For example, an optical module maintains a necessary bandwidth by passing a greater current at a higher transmission rate, in order to achieve the higher transmission rate. Digital signal processing chips using the CMOS technology use power almost proportional to the square of the operation clock rate. This means that an increased transmission rate will increase power consumption accordingly in the future.

PON subscribers, however, prefer a rather faster PON but are not demanding a high transmission rate continuously. A high transmission rate is not required in a no communication period, of course. Even during communication, especially when a great amount of image data or a large file is downloaded or uploaded in the Internet access network, a high transmission rate is demanded, but such a high transmission rate is not needed during browsing or other operation. In the TCP protocol used for data transmission, when a given number of packets is received, a confirmation signal packet must be returned, and the data transmitter sends subsequent data only after the confirmation signal packet is received. In the actual operation, data traffic during data transmission often has highly bursty characteristics. Substantially, the optical modules and chips used in actual PONs operate continuously and consume power, even during a period in which no data is transmitted. To avoid this great waste of power, a PON system is demanded that can perform transmission at a low rate when the end user traffic is low and at a high rate when the end user traffic is high.

In view of the problems described above, an object of the present invention is to provide a passive optical network system that can operate a plurality of PONs of different specifications (standards), which have different transmission rates, and can minimize waste of power in accordance with the end user traffic.

Means to Solve the Problems

For solving the problems, a configuration is provided in a passive optical network system of the present invention in which a master station and a plurality of slave stations are connected by an optical fiber network comprising an optical splitter and a plurality of optical fibers; the master station determines the amount of signal to be transmitted from each of the plurality of slave stations to the master station and its transmission timing, in accordance with requests sent from the plurality of slave stations; and the master station receives signals from the plurality of slave stations through the optical fiber network;

wherein the master station comprises a control unit which determines on a constant cycle the amount of signal that each of the plurality of slave stations is permitted to send to the master station, its transmission timing, and its transmission rate, in accordance with the amount of signal transmission requested by each of the plurality of slave stations; furthermore, each of the plurality of slave stations comprises a control unit for sending a signal to the master station at a first transmission rate or a second transmission rate which is higher than the first transmission rate, and the control unit sends the signal either at the first transmission rate or the second transmission rate, in accordance with a report sent from the master station.

Furthermore, a configuration is provided in which, when the control unit of the master station determines the amount of signal that a given slave station is permitted to send, in accordance with the amount of signal requested by each of the plurality of slave stations, if the amount of signal permitted to send falls below the greatest possible transmission amount at the first transmission rate, the signal transmission rate of the slave station is set to the first transmission rate, and, if the amount of signal permitted to send exceeds the greatest possible transmission amount at the first transmission rate, the signal transmission rate of the slave station is set to the second transmission rate.

A configuration can be chosen in which the transmission rate is not be determined by the master station, and each of the plurality of slave stations makes a determination by comparing the requested amount of signal transmission and the permitted amount of signal transmission.

Effects Of The Invention

According to the present intervention, it is possible to provide a passive optical network system that can operate a plurality of PONs of different specifications (standards), which have different transmission rates, and can minimize waste of power in accordance with the end user traffic.

BRIEF DESCRIPTION OF THE DRAWINGS

FIG. 10 is a memory configuration diagram showing example configurations of a byte length assignment table;

FIG. 11 is a memory configuration diagram showing example configurations of a transmission timing table;

FIG. 14 is a memory configuration diagram illustrating different example configurations of the byte length assignment table;

FIG. 15 is a memory configuration diagram showing different example configurations of the transmission timing table;

FIG. 20 is a memory configuration diagram illustrating an example configuration of a memory for holding information used to control upstream signal transmission in the ONU.

BEST MODE FOR CARRYING OUT THE INVENTION

The configuration and operation of a PON according to an embodiment will be described next in detail with reference to the drawings, by illustrating the configuration and operation of a PON that includes both a GPON stipulated in the ITU-T Recommendation G.984.3 and a 10GPON, which is a next-generation GPON with an improved transmission rate that is expected to be introduced in the future.

In the description given below, like the GPON, a PON configured to perform TDM of variable-length data is assumed. The PON has a mixed configuration in which the downstream data transmission rate from the OLT to each ONU is always 10 Gbps (actually 9.95328 Gbps), and the upstream data transmission rate from the ONU to OLT is 1 Gbps (actually 1.24416 Gbps) in the GPON and is 10 Gbps (actually 9.95328 Gbps) in the 10GPON. These numerical values of transmission rate and the like are examples, different values of transmission rate can be used, and this embodiment is not limited to those numerical values. Three or more upstream transmission rates may be provided.

Figure 1:
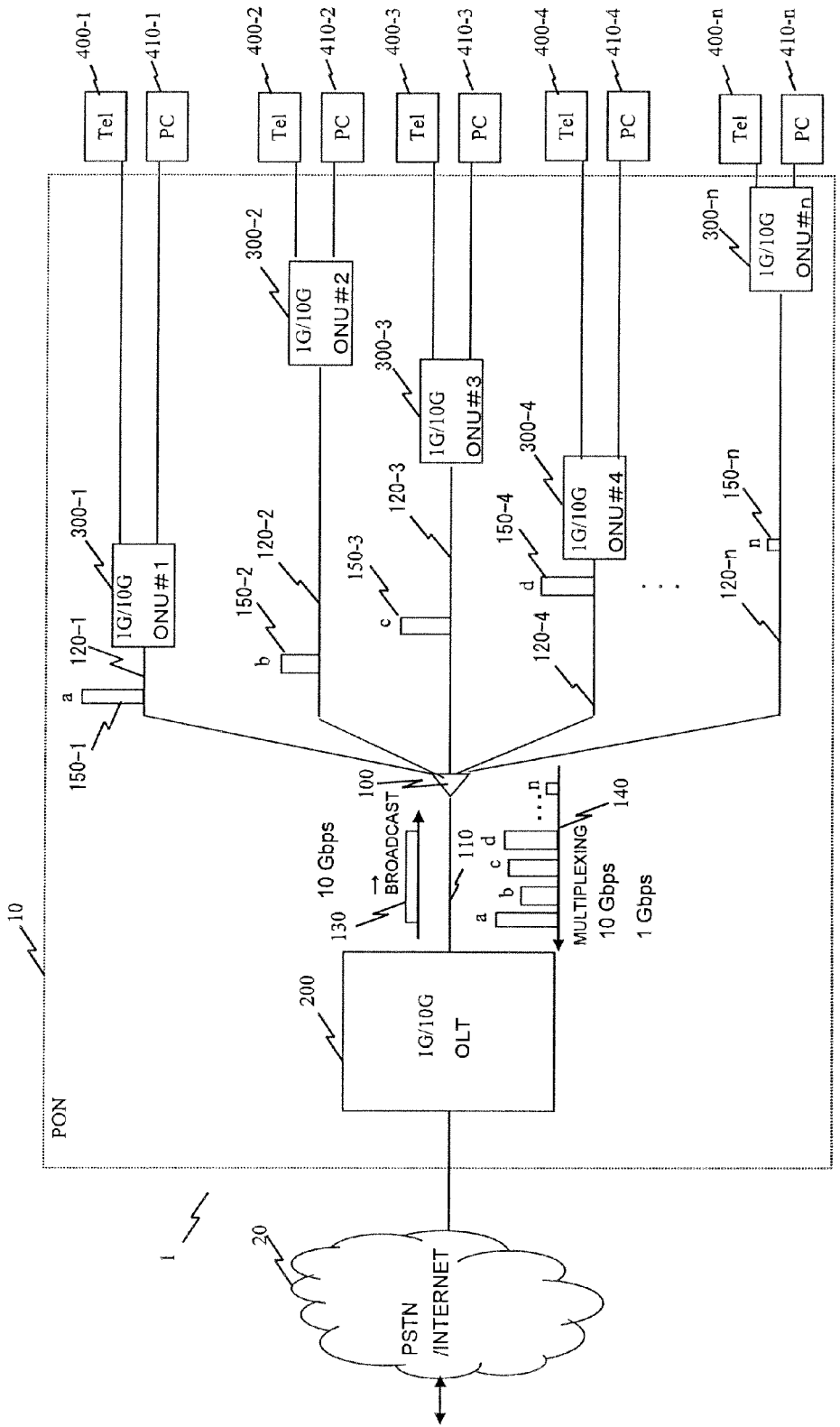
FIG. 1 is a network configuration diagram showing an example configuration of an optical access network using a PON.

FIG. 1 is a network configuration diagram showing an example configuration of an optical access network using a PON of the present invention.

An access network 1 is a network that connects an upper communication network such as a public switched telephone network (PSTN) or the Internet 20 (hereinafter sometimes called just an upper network) and subscriber terminals (such as a Tel 400 and a PC 410), through a PON 10, for example, and allows communication there. The PON 10 includes an OLT (hereinafter sometimes called a master station) 200 connected to the upper network 20 and a plurality of ONUs (hereinafter sometimes called slave stations) 300 serving subscriber terminals such as the Tel 400 and the PC 410. A passive optical network that includes a trunk optical fiber 110, an optical splitter 100, and a plurality of branch optical fibers 120 connects the OLT 200 and the ONUs 300 to allow communication between the upper network 20 and the subscriber terminals 400 and 410 or communication between the subscriber terminals 400 and 410. The ONU 300 can be used for both the 10GPON and the GPON, for example (the ONU can send an upstream signal, for example, at 10 Gbps or 1 Gbps and is hereafter sometimes called an 1G/10G ONU). In the figure, five ONUs 300 are connected to the OLT 200. According to the ITU-T Recommendation G984.3, up to 254 ONUs can be connected to the OLT 200.

In a downstream signal 130 from the OLT 200 to the ONUs 300, signals addressed to the ONUs 300 are time-division-multiplexed and broadcast. Each ONU 300 judges whether a reached frame has its transmission rate or is a signal addressed to it, and receives an appropriate signal. The ONU 300 sends the received signal to the Tel 400 or PC 410 in accordance with the destination of the signal. An upstream signal 140 from the ONUs 300 to the OLT 200 is made of an upstream signal 150-1 sent from the ONU 300-1, an upstream signal 150-2 sent from the ONU 310-2, an upstream signal 150-3 sent from the ONU 300-3, an upstream signal 150-4 sent from the ONU 300-4, and a signal 150-n sent from the ONU 300-n, and these signals are optically time-division multiplexed by the optical splitter 100 and sent as an optically multiplexed signal 140 to the OLT 200. Because the fibers between the ONUs 300 and the OLT 200 vary in length, the signal 140 is a multiplexed signal made of signals with different amplitudes. For example, an optical signal in a wavelength band of 1.5 µm is used as the downstream signal 130; an optical signal in a wavelength band of 1.3 µm is used as the upstream signals 140 and 150; and both types of optical signals are subjected to wavelength division multiplexing (WDM) and sent and received over the optical fibers 110 and 120.

Figure 2:
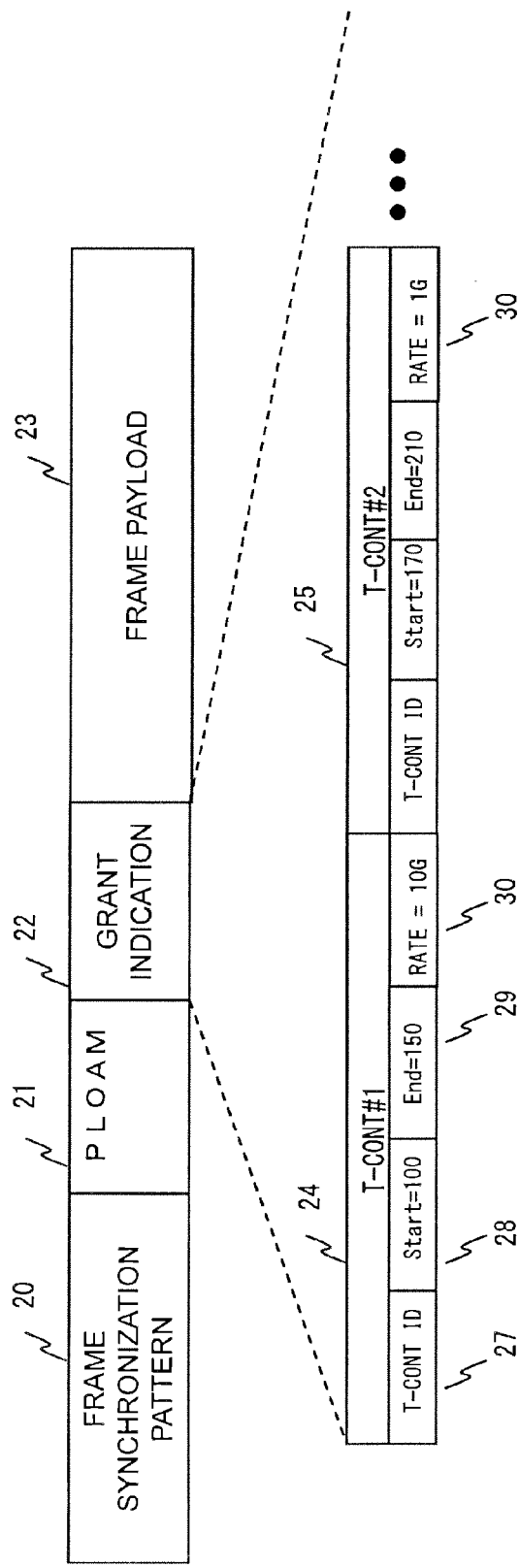
FIG. 2 is a frame configuration diagram showing an example configuration of a downstream signal from an OLT to an ONU.

FIG. 2 is a frame configuration diagram showing an example configuration of a downstream signal.

The downstream signal (hereafter sometimes called a downstream frame or a frame) has a 125-µs cycle structure stipulated by the ITU-T Recommendation G984.3 and includes a frame synchronization pattern 20, a physical layer operation, administration and maintenance (PLOAM) field 21, a grant indication field 22, and a frame payload field 23. The frame synchronization pattern 20 is a fixed pattern by which each ONU 300 identifies the beginning of the 125-µs frame. The PLOAM field 21 stores information used by the OLT 200 for management of the physical layer of each ONU 300. The frame payload field 23 holds a user signal sent from the OLT 200 to each ONU 300. In the grant indication field 22, an upstream signal transmission timing (grant) of each ONU 300 is indicated. More specifically, a grant is indicated for each TCONT, which is a unit of user signal control in each ONU 300.

The figure shows an example configuration corresponding to the configuration shown in FIG. 1 and includes a TCONT#1 signal 24 for controlling the ONU 300-1 and a TCONT#2 signal 25 for controlling the ONU 300-2. Each TCONT signal includes a TCONT ID 27 for identifying the TCONT, a Start field 28 for indicating the timing when signal transmission starts, an End field 29 for indicating the timing when the signal transmission ends, and a transmission rate specification field 30. The transmission rate specification field 30 is provided to specify whether a 1-Gbps signal or a 10-Gbps signal is used as the upstream signal in the PON of the present invention. The Start field and the End field 29 indicates the transmission start timing and the transmission end timing of the two types of signals described above. In this embodiment, the unit of time is specified in bytes at a 1 Gbps signal, and the unit of time at a 10-Gbps signal is specified in units of eight bytes. Because the rate of the 10-Gbps signal is eight times greater than the rate of the 1-Gbps signal, the specification method makes possible to use a single expression for both the 1-Gbps signal and the 10-Gbps signal. The OLT 200 sends a message that permits transmission of upstream data which includes the grant indication field 22, to each ONU 300 periodically, and specifies in each TCONT the size of the upstream communication band to be used. The Start field 28 and the End field 29 hold information indicating the timings at which data transmission should start and end in each cycle in which the OLT sends a grant indication. The ONU 300 sends the upstream signal at the transmission rate specified in the transmission rate specification field 30 in the specified segment. The length of data to be sent may be specified instead of the End field 29, so that the data of the specified data length is sent from the timing indicated in the Start field 28.

Figure 3:
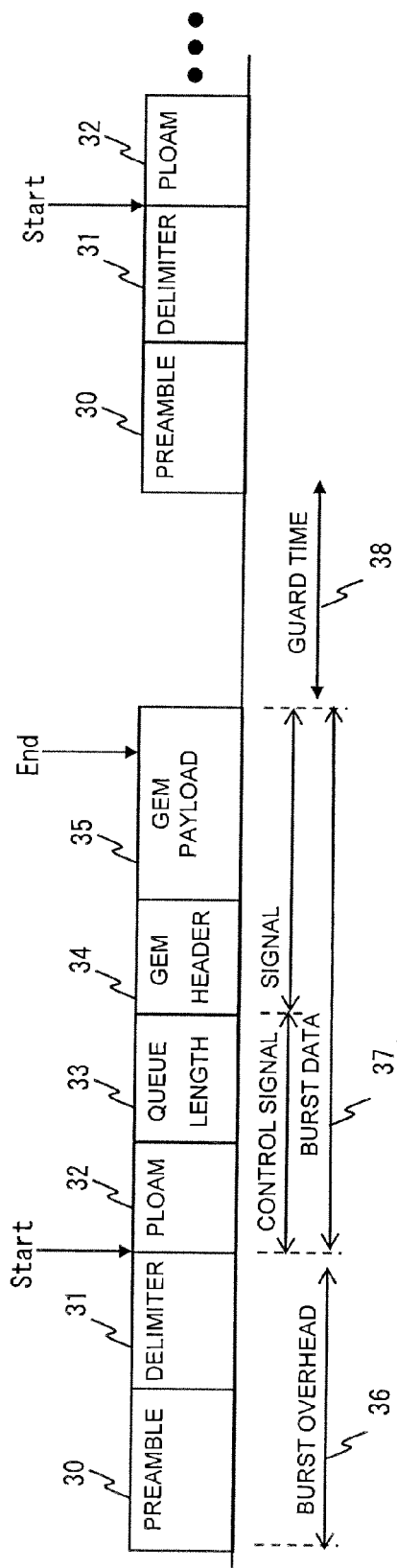
FIG. 3 is a signal configuration diagram showing an example configuration of an upstream signal from the ONU to the OLT.

FIG. 3 is a signal configuration diagram showing an example configuration of the upstream signal.

The upstream signal (hereafter sometimes called a GEM packet or a packet) is a variable-length packet formed of a fixed-length burst overhead 36 containing a preamble 30 and a delimiter 31, and burst data 37 containing a control signal that includes a PLOAM field 31 and a queue length field 33, a five-byte GEM header 34, and a variable-length GEM payload 35. The Start field 28 indicates the start position of the PLOAM field 32, that is, the start position of the burst data 37, and the End field 29 indicates the end position of the GEM payload 35 (burst data 27). A guard time 38 is a no-signal zone between the end position of the GEM payload 34 and the start position of the preamble 30 of the next packet. The no-signal zone of a length specified in the ITU-T Recommendation G984.3 is placed to prevent collision or interference of packets sent from the ONUs 300 on the trunk optical fiber 17-1. Since the guard time 38, the preamble field 30, and the delimiter field 31 are placed between the burst data 37 sent from the ONU 300s (or TCONTs), a several-byte interval occurs between the timing specified the End field 29 of the burst data 37 and the timing specified in the Start field 28 of the following burst data 37.

Figure 4:
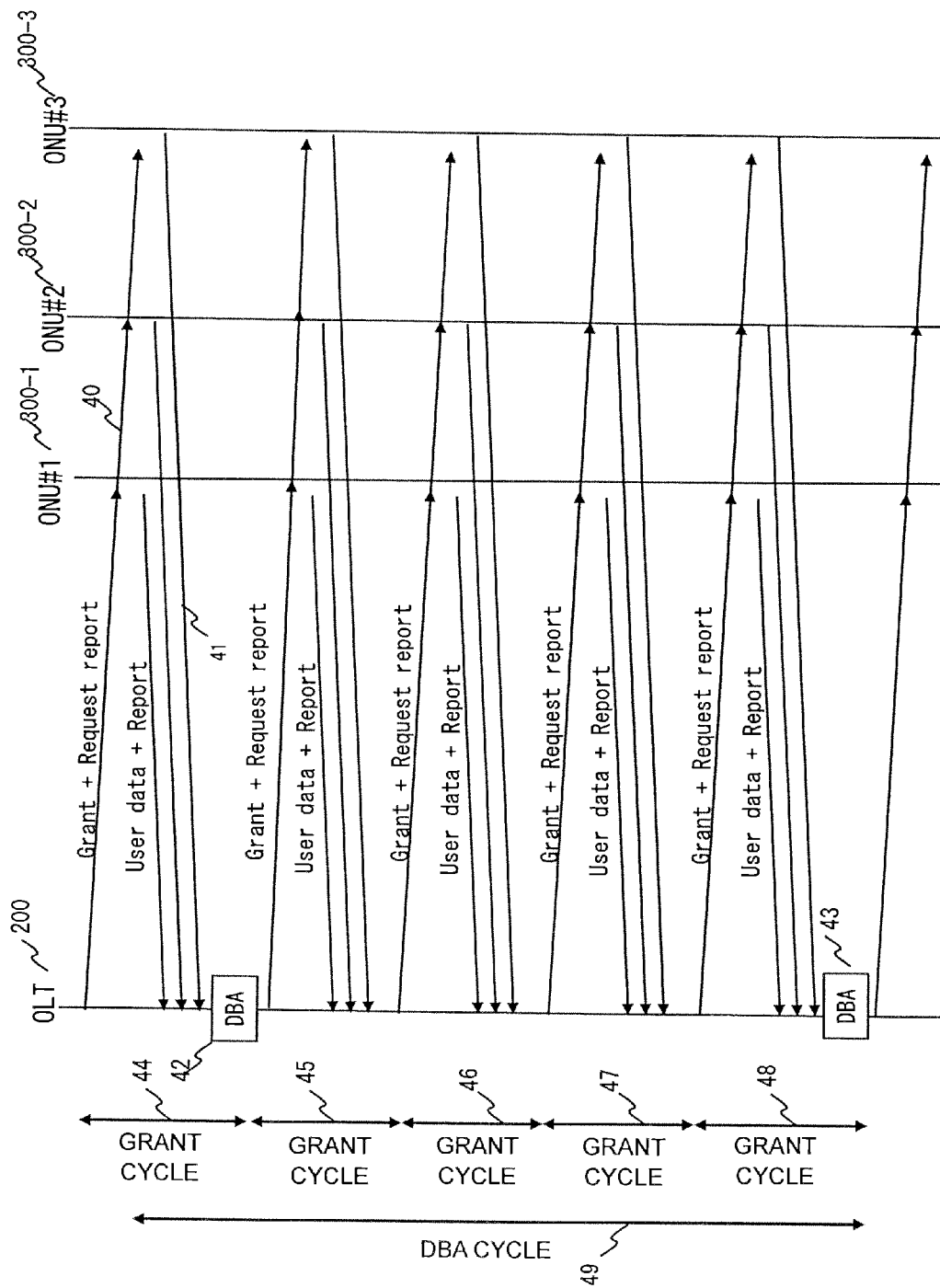
FIG. 4 is a sequence diagram showing an example operation of the PON.

FIG. 4 is a sequence diagram showing an example operation of the PON and shows the relationships between the DBA operation and the cycle and between the grant operation based on the results of DBA and the cycle.

The OLT 200 sends a transmission permission message 40 that includes the grant indication field 22 in each of the 125-µs grant cycles 44 to 48, to the ONUs 300-1 to 10-3. The transmission permission message 40 also includes information (request report) that requests a report of the amount of data to be transmitted, accumulated in a transmission queue provided for the TCONT of each ONU. Each ONU 300 sends the data accumulated in the transmission queue in the time slots specified by the Start field 28 and the End field 29 of the grant indication field 22 and reports the amount of data to be transmitted, included in the transmission queue to the OLT 200 (report) by using the queue length field 33 in the upstream message 41 (packet shown in FIG. 3).

The OLT 200 performs DBAs 42 and 43 that determine the amount of data that each ONU (TCONT) is permitted to send, on the basis of the report (amount of data to be transmitted) received from the ONU 300 in a predetermined DBA cycle 49. More specifically, the amount of data that each TCONT is permitted to send in the next session is determined on the basis of the amount of data to be transmitted and the agreement with each user. This DBA does not need to be executed in each of the 125-µs grant cycles 45 to 48, and DBA is executed once for a plurality of grant cycles. In this embodiment, DBA is performed once for four grant cycles (0.5 ms). Since a single DBA 42 determines the amount of data that all the TCONTs are permitted to send, the OLT 200 determines the TCONT that can send data in each grant cycle and the data transmission timings in the Start field 28 and the End field 29 such that the amount of data that all the TCONTs are permitted to send is sent in given grant cycles of the grant cycles 45 to 48. These Start field 28 and End field 29 included in the transmission permission messages 40 that includes the grant indication field 22 (Grant) are sent to the ONUs 300-1 to 10-3, and the ONUs 300-1 to 10-3 send data to the OLT 200 at the timings determined by the grant. The description of the PON having a DBA cycle of 0.5 ms and a grant cycle of 125 µs will continue, but the DBA cycle and the grant cycle may be set to different values.

Figure 5:
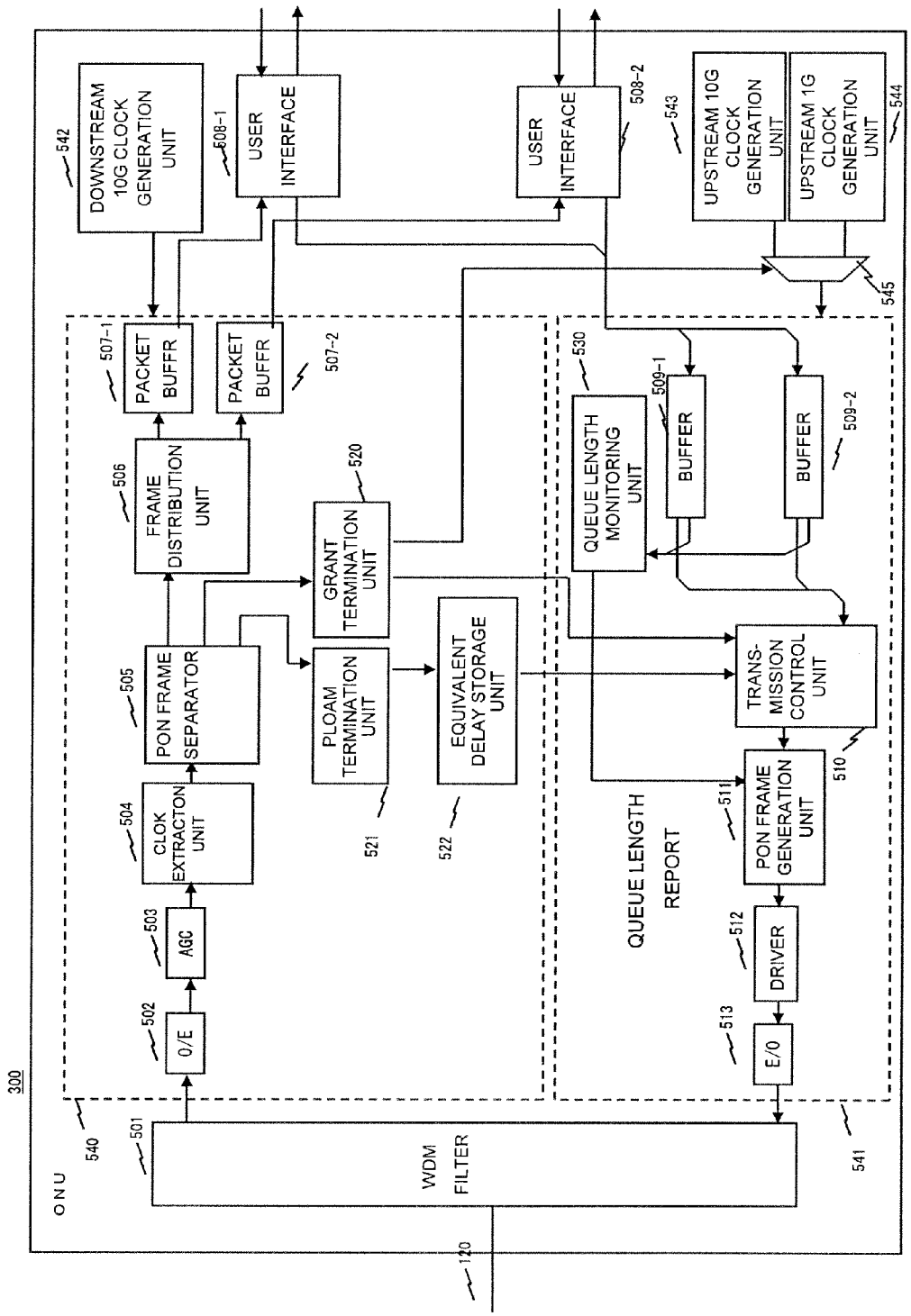
FIG. 5 is a block diagram showing an example configuration of the ONU.

FIG. 5 is a block diagram showing an example configuration of the ONU used in the PON of the present invention.

The ONU 300 includes a WDM filter 501, a reception unit 540, a transmission unit 541, and a user interface (IF) 508. The reception unit 540 includes an O-E conversion unit 502, an AGC 503, a clock extraction unit 504, a PON frame separator 505, a frame distribution unit 506, a packet buffer 507, a grant termination unit 520, a PLOAM termination unit 521, and an equivalent delay storage unit 522. The transmission unit 541 includes a packet buffer 509, a transmission control unit 510, a PON frame generation unit 511, a driver 521, an E-O conversion unit 513, a queue length monitoring unit 530. The operation clock of the reception unit 540 is supplied by a downstream 10G clock generation unit 542. The output from either an upstream 10G clock generation unit 543 or an upstream 1G clock generation unit 544 is selected by a selector 545 and supplied as the operation clock of the transmission unit 541. The selector control is determined by a transmission rate indication (30 in FIG. 2) from the OLT 200, read by the grant termination unit 520.

An optical signal received from the branch optical fibers 120 is divided by wavelength by the WDM filter 501 and then converted to an electrical signal by the O-E conversion unit 502. After the AGC 503 regulates the amplitude of the electrical signal to a constant level, the clock extraction unit 504 performs retiming, and the PON frame separator 505 separates the signal as illustrated in FIG. 2. More specifically, a signal in a PLOAM field 1902 is sent to the PLOAM termination unit 521; a signal in a grant indication field 1903 is sent to the grant termination unit 520; and a signal in the frame payload field 1904 is sent to the frame distribution unit 506. User signals output from the frame distribution unit 505 are stored temporarily in a packet buffer 507-1 and a packet buffer 507-2 and then output through a user interface 508-1 and a user interface 508-2, respectively.

Signals input through the user interfaces 508-1 and 508-2 are temporarily stored in the packet buffers 509-1 and 509-2, respectively, read as controlled by the transmission control unit 510, and built up to a packet (see the format in FIG. 3) by the PON frame generation unit 511. The queue length monitoring unit 530 monitors the usage of the packet buffer 509. The buffer usage information is stored in the queue length field 33 of the packet and reported to the OLT, and the OLT 200 performs DBA in accordance with the information and adjusts the amount of grant to be issued. The signal built up by the PON frame generation unit 511 is converted to current by the driver 512, converted to an optical signal by the E-O conversion unit 513, and sent through the WDM filter 501 to the branch optical fibers 120. The transmission control unit 510 controls signal transmission to the OLT in accordance with the grant value extracted by the grant termination unit 520.

Since the ONUs 300 are at different distances from the OLT 200, the differences in distance are corrected by ranging specified in the ITU-T Recommendation G984.3. With this ranging, a transmission timing correction value, called an equivalent delay value, is stored in the PLOAM field 21 shown in FIG. 2 and reported to each ONU 300. The ONU 300 corrects the distance by storing the equivalent delay value received through the PLOAM termination unit 521 in the equivalent delay storage unit 522 and letting the transmission control unit 510 adjust the signal transmission timing in accordance with the equivalent delay value, so that signals from the ONUs 300-1 to 300-n do not collide with one another on the trunk optical fiber 110.

The function blocks of the ONU 300 are implemented by the firmware stored in the memory or CPU or by electrical components and other components such an electrical-optical conversion circuit, a memory, and an amplifier. The functions may also be implemented by special hardware (such as an LSI) exclusively provided for the corresponding processing. The configuration of the ONU 300 is not limited to the one described above, and a variety of functions may be implemented when needed.

Figure 6:
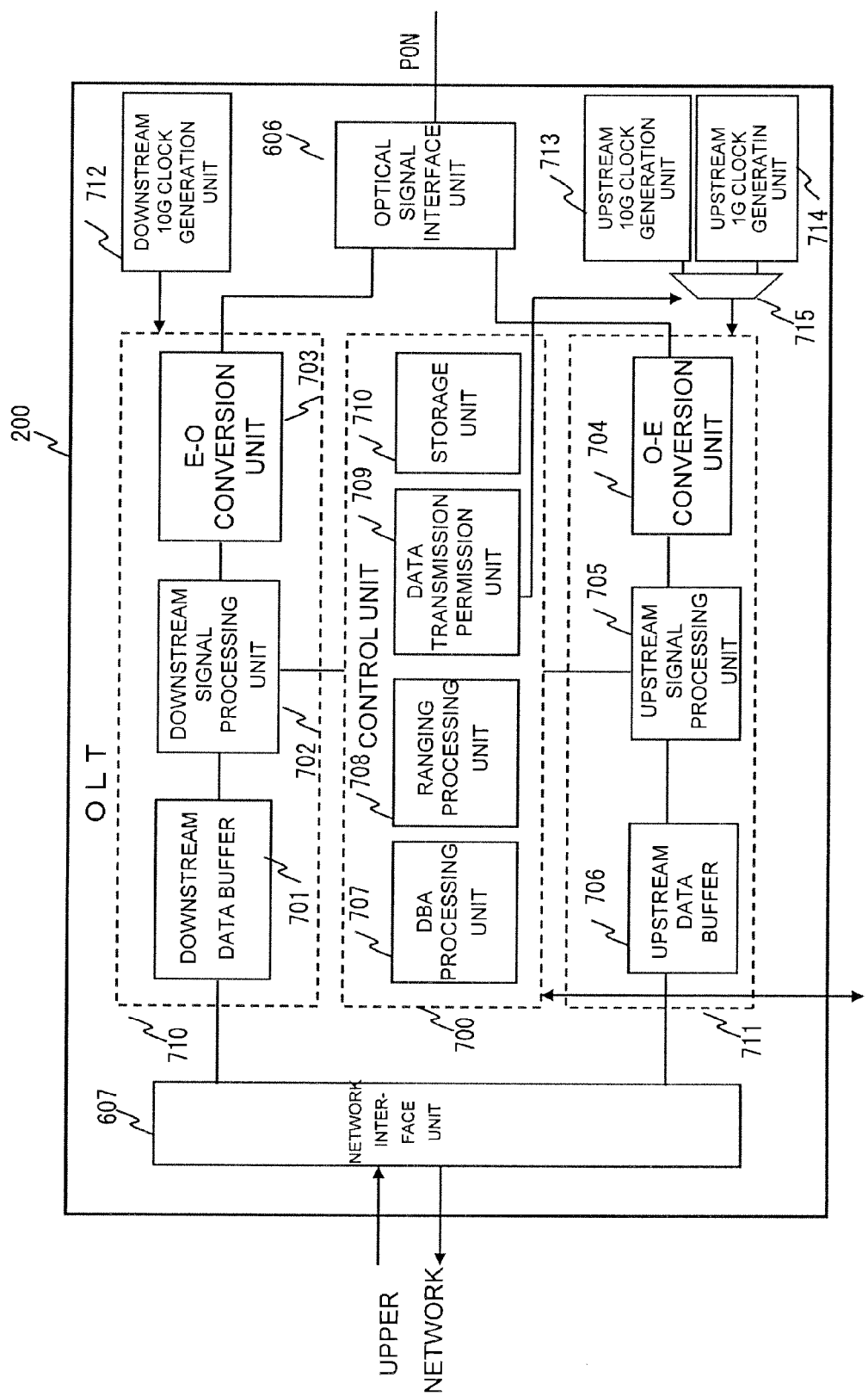
FIG. 6 is a block diagram showing an example configuration of the OLT.

FIG. 6 is a block diagram showing an example configuration of the OLT used in the PON of the present invention.

The OLT 200 includes a network interface unit 607, a control unit 700, a transmission unit 710, a reception unit 711, and an optical signal interface unit 606. The transmission unit 710 includes a downstream data buffer 701, a downstream signal processing unit 702, and an E-O conversion unit 703. The reception unit 711 includes an O-E conversion unit 704, an upstream signal processing unit 705, and an upstream data buffer 706. The operation clock of the transmission unit 710 is supplied by a downstream 10G clock generation unit 712.

The output from either an upstream 10G clock generation unit 713 or an upstream 1G clock generation unit 714 is selected by a selector 715 and supplied as the operation clock of the reception unit 711. The selector control is performed by a data transmission permission unit 709. A specific method of determining a transmission rate will be described later in detail with reference to a figure.

The downstream data buffer 701 temporarily stores data received from the upper network 20 through the network interface unit 607. The downstream signal processing unit 702 performs processing needed to relay an optical signal from the upper network 20 to the ONUs 300. The E-O conversion unit 703 converts an electrical signal to an optical signal and sends the optical signal (downstream signal) through the optical signal interface unit 606 to the ONUs. The O-E conversion unit 704 converts an optical signal received from the ONUs 300 through the optical signal interface unit 606 to an electrical signal. The upstream signal processing unit 705 performs processing needed to relay the signal from the ONUs 300 to the upper network 20. The upstream data buffer 706 temporarily stores data to be sent to the upper network 20 through the network interface unit 607. The control unit 700 is connected to the function blocks described above, executes processing needed for communications (monitoring, control, etc.) with a plurality of ONUs 300, and also has a function to relay a signal between the upper network 20 and the ONUs 300.

A DBA processing unit 707 performs dynamic bandwidth assignment processing that determines a communication bandwidth to be assigned to each ONU 300 (TCONT) served by the OLT 200 in each DBA cycle at predetermined DBA intervals (at intervals of 0.5 ms in this embodiment). The number of bytes assigned to each ONU 300 (TCONT) is determined within the range of the total bytes that can be sent in a single DBA cycle. A ranging processing unit 708 sends a ranging signal related to distance measurement to each ONU prior to data transmission or reception between the OLT 200 and each ONU 300, measures the distance between the OLT 200 and the ONU 300 by measuring a time period until a response to the signal is received, and adjusts the delay time of the sent signal so that signals from the ONUs 300 to the OLT 200 do not collide or interfere with one another. More specifically, the ranging processing unit 708 receives a response signal to the ranging signal received through the upstream signal processing unit 705, generates an equivalent delay value described with reference to FIG. 5, and sends it through the downstream signal processing unit 702 to each ONU 300, in accordance with the ranging procedure specified in the ITU-T Recommendation G984.3. After the OLT 200 reports the transmission delay time to each ONU 300, the ONU 300 sends data by adding the reported transmission delay time to the permitted data transmission timing (grant) specified in DBA by the OLT 200. The data transmission permission unit 709 determines the timing when each ONU should start data transmission in a grant cycle (Start field in FIG. 2) and the timing when the data transmission should end (End field 29 in FIG. 2) in bytes, in accordance with the byte length of data the ONU 300 is permitted to send, determined by the DBA processing unit 707. In addition, a rate at which the ONU 300 is permitted to send the signal (1 Gbps or 10 Gbps in this embodiment) is determined. That is, a grant is indicated. The storage unit 710 is a memory for storing information needed in processing in the control unit 700. The control unit 700 performs communication with a control board (such as a maintenance terminal configured by a PC) provided in the PON, specifies control parameters (such as an ONU subscription condition and stipulatory traffic) required in the control operation beforehand in the control unit, and receives monitoring information (such as problem occurrence statuses and an amount of data that each ONU is permitted to send) as requested by the maintenance person.

The function blocks of the OLT 200 are implemented by the firmware stored in the memory or CPU or by electrical components and other components such an electrical-optical conversion circuit, a memory, and an amplifier. The functions may also be implemented by hardware (such as an LSI) exclusively provided for the corresponding processing. The configuration of the ONU 300 is not limited to the one described above, and a variety of functions may be implemented when needed.

Figure 7:
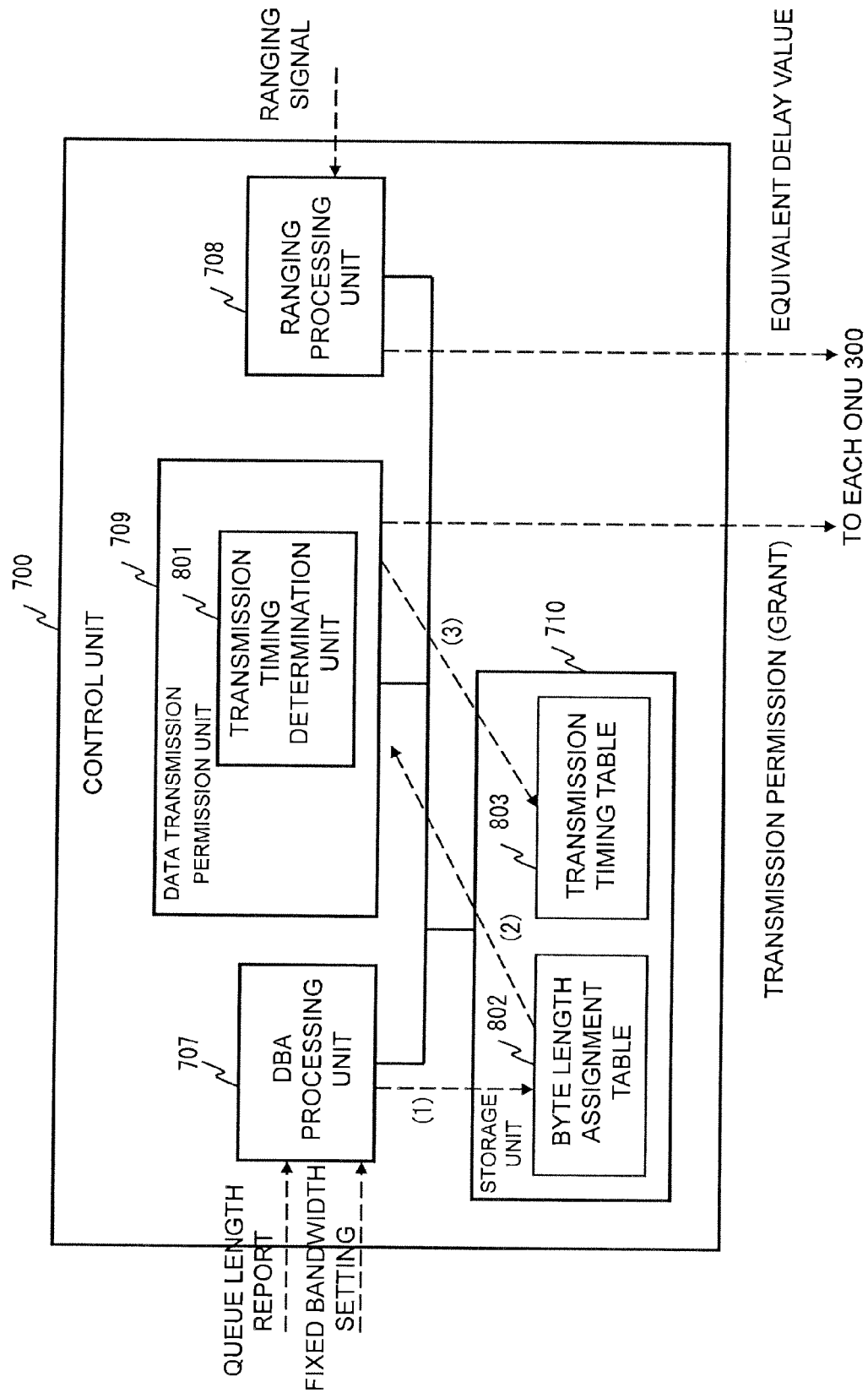
FIG. 7 is a view illustrating the configuration and an example operation of a control unit of the OLT.
Figure 8:
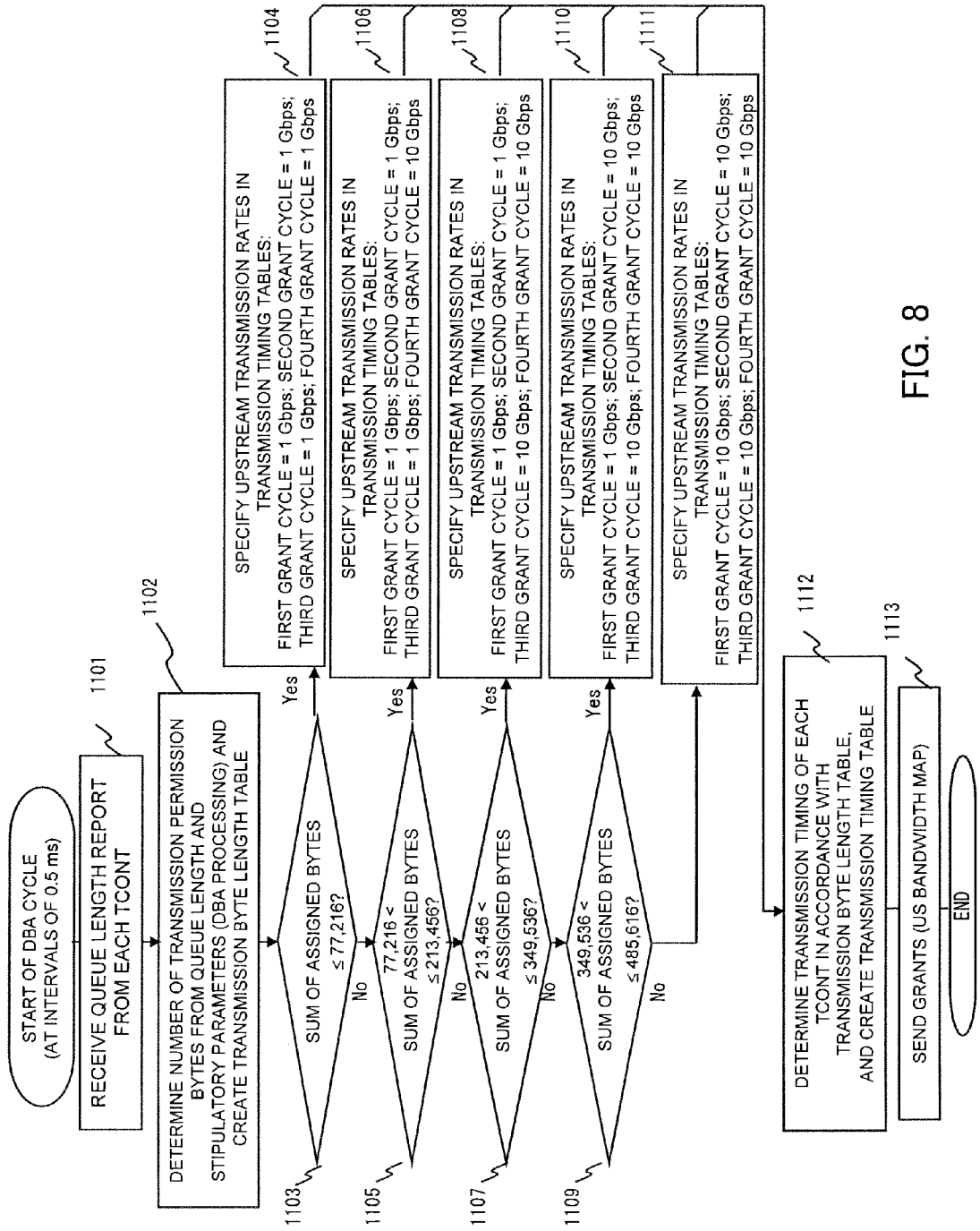
FIG. 8 is an operation flowchart illustrating an example operation (part 1) of the OLT control unit.
Figure 9:
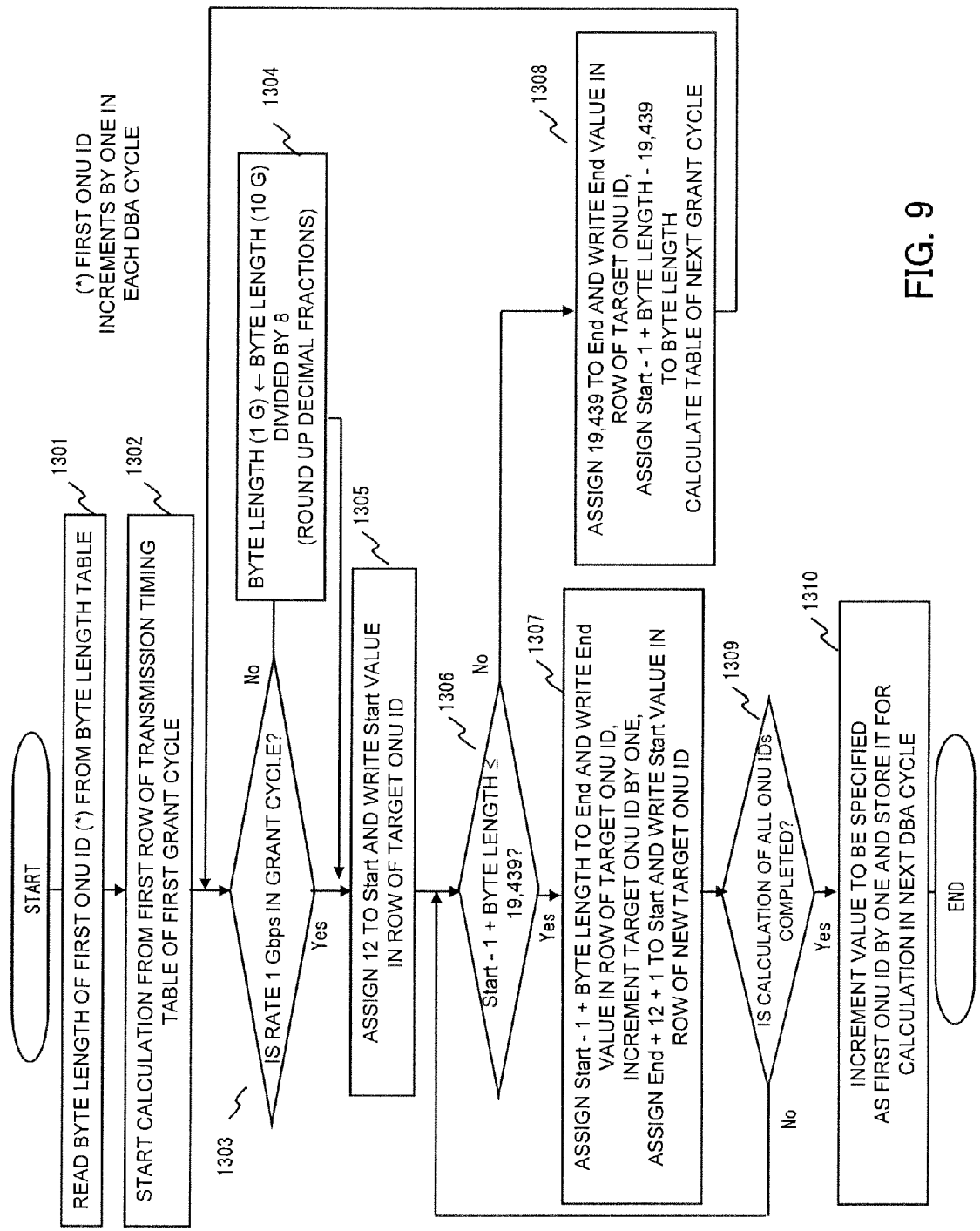
FIG. 9 is an operation flowchart illustrating an example operation (part 2) of the OLT control unit.
Figure 12:
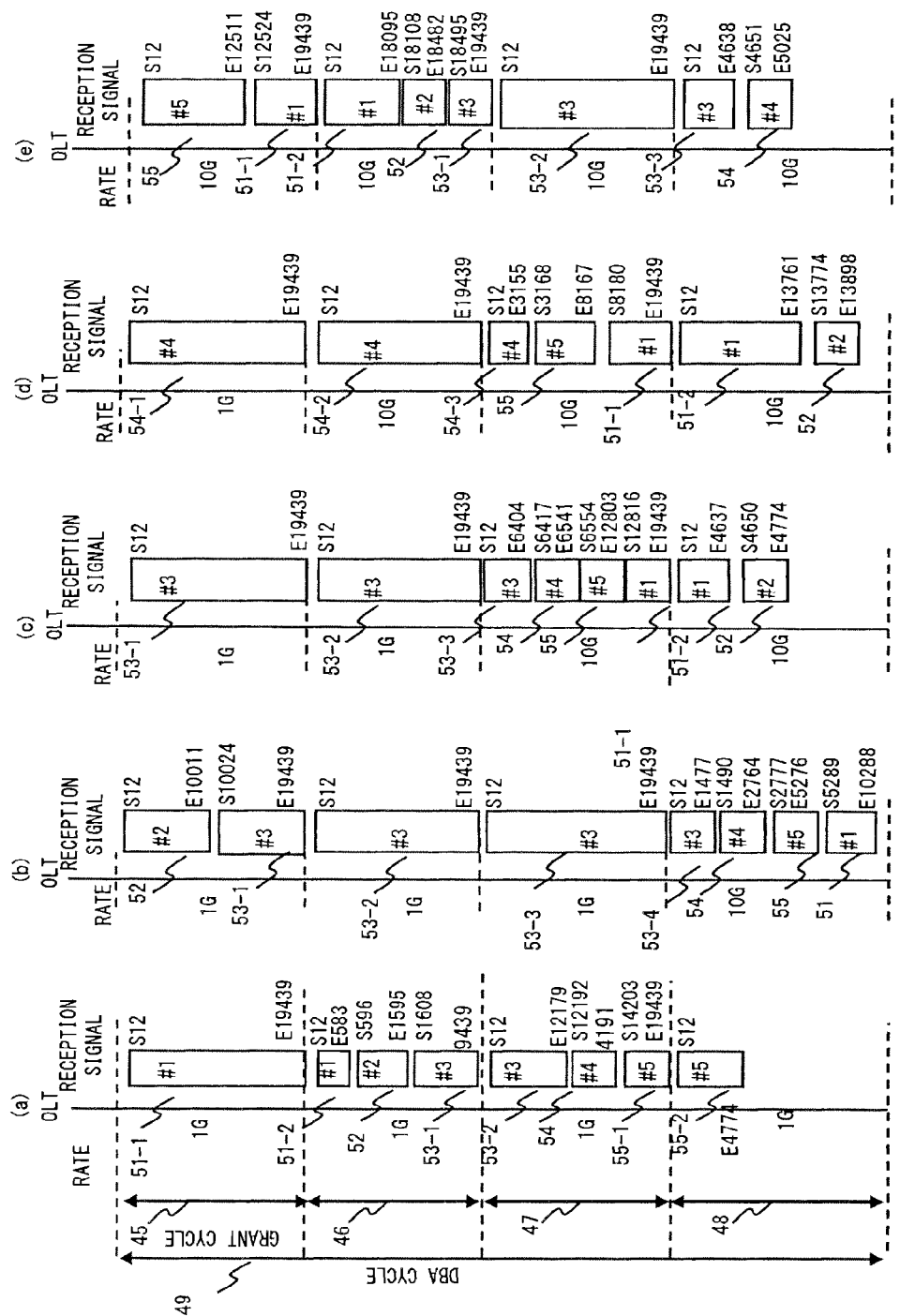
FIG. 12 is a view illustrating an example operation to receive an upstream signal by the OLT.

FIG. 7 is a view illustrating the configuration and an example operation of the control unit provided for the OLT. FIGS. 8 and 9 are operation flowcharts showing example operations of the OLT control unit. FIG. 10 is a memory configuration diagram showing example configurations of a byte length assignment table that holds a bandwidth (bytes) assigned to each ONU, generated by the control unit. FIG. 11 is a memory configuration diagram showing example configurations of a transmission timing table that holds signal transmission timings and transmission rates of the ONUs, generated by the control unit. FIG. 12 is a view illustrating how the OLT receives an upstream signal sent by each ONU that has been selected in the operation of the control unit.

The operation and configuration of the PON of the present invention, or more specifically, bandwidth assignment to the ONUs and transmission rate determination, performed by the OLT, and the configuration, will be described in detail with reference to the above described figures.

(1) The DBA processing unit 707 receives a queue length (33 in FIG. 3), which is the amount of data in a transmission queue of each ONU 300 in the DBA cycle, from the upstream signal (step 1101 in FIG. 8).

The DBA processing unit 707 has parameters related to the amount of data that the ONU is permitted to send (fixed bandwidth setting, etc.), specified by the maintenance person from the control board (see FIG. 7) in accordance with the agreement. So, the number of bytes (the amount of data that is permitted to send (communication bandwidth)) assigned to each ONU 300 in the next DBA cycle is determined on the basis of the received queue length and the values of stipulatory parameters specified beforehand. A byte length assignment table 802 showing the correspondence between the identifier of each ONU (ONU-ID) and the assigned byte length is created and stored in the storage unit 710 ((1) in FIG. 7, step 1102 in FIG. 8).

FIG. 10 shows example configurations of the byte length assignment table 802, which includes an ONU identifier (ONU-ID) 901 and a byte length 902 assigned to each ONU by DBA. The figure shows examples in which byte lengths are assigned to the ONUs in accordance with the queue lengths from the ONUs, in five combinations (a) to (e). From (a) to (e), the queue lengths from the ONUs increase, and the number of bytes assigned to each ONU and the sum of bytes assigned in a DBA cycle increase. In the description given earlier, band assignment and the like are executed on a TCONT basis. In this embodiment, however, each ONU has a single TCONT, and the TCONT ID agrees with the ONU ID, and the table indicates the ONU-ID. If the ONU has a plurality of TCONTs, the table is created on the TCONT basis (the same applies to the subsequent description).

(2) A transmission timing determination unit 801 provided for the data transmission permission unit 709 reads the contents of the byte length assignment table 802 ((2) in FIG. 7), assigns a time slot corresponding to the byte length 902 assigned to each ONU in each grant cycle, creates a transmission timing table 803 which shows the correspondence between the ONU ID and the byte length assigned in each grant cycle, and stores it in the storage unit 710 ((3) in FIG. 7). More specifically, the transmission timing and transmission rate of the ONUs are determined by executing the operation described below.

In this embodiment, four grant cycles (125 μs each) form a single DBA cycle, and the number of bytes that can be sent in a single DBA cycle at a transmission rate of 1 Gbps is 1.24416 Gbps×125 μs×4 cycles/8=77,760 bytes. If it is considered that signals from 32 ONUs, for example, should be preceded by a 12-byte burst overhead each, the number of bytes that can be used substantially is 77,760−12×32=77,216 bytes. This means that if the amount of data in transmission queue from all the ONUs, or the total queue length, is up to 77,216 bytes, all of the assigned data can be sent at a transmission rate of 1 Gbps. If the total queue length is greater than 77,216 bytes, all of the requested data cannot be sent at a rate of 1 Gbps, and the transmission rate should be raised to 10 Gbps.

If the transmission rate is 1 Gbps in three of the four grant cycles forming a single DBA cycle and 10 Gbps in the remaining one grant cycle, the number of bytes that can be sent in the DBA cycle can be raised up to 1.24416 Gbps×125 μs×3 cycles/8+9.95328 Gbps×125 μs×1 cycle/8=213,840 bytes. After the burst overheads of the 32 ONUs are subtracted as described earlier, the substantially usable byte length is 213,840−12×32=213,456 bytes. If the transmission rate is 1 Gbps in two of the four grant cycles and 10 Gbps in the remaining two grant cycles, the number of bytes that can be sent in the DBA cycle can be raised up to 1.24416 Gbps×125 μs×2 cycles/8+9.95328 Gbps×125 μs×2 cycles/8=349,920 bytes. After the burst overheads of the 32 ONUs are subtracted, the substantially usable byte length is 349,920 12×32=349,536 bytes. If the transmission rate is 1 Gbps in one of the four grant cycles and 10 Gbps in the remaining three grant cycles, the number of bytes that can be sent in the DBA cycle can be raised up to 1.24416 Gbps×125 μs×1 cycle/8+9.95328 Gbps×125 μs×3 cycles/8=486,000 bytes. After the burst overheads of the 32 ONUs are subtracted, the substantially usable byte length is 486,000 12×32=485,616 bytes. If the transmission rate is 10 Gbps in all of the four grant cycles, the number of bytes that can be sent in the DBA cycle can be raised up to 9.95328 Gbps×125 μs×4 cycles/8=622,080 bytes. After the burst overheads of the 32 ONUs are subtracted, the substantially usable byte length is 622,080−12×32=621,969 bytes.

The data transmission permission unit 709 determines the transmission rate as described below in accordance with the sum of assigned byte lengths obtained from the byte length assignment table 802 and inputs the transmission rate in each of the grant cycles of the transmission timing table 803.

(A) Check whether the sum of assigned byte lengths ≤77,216 (step 1103 in FIG. 8). If Yes, set the rates of all the grant cycles to 1 Gbps (step 1104 in FIG. 8).

(B) Check whether 77,216<sum of assigned byte lengths ≤213,456 (step 1105 in FIG. 8). If Yes, set the rates of the first to third grant cycles to 1 Gbps and the rate of the fourth grant cycle to 10 Gbps (step 1106 in FIG. 8).

(C) Check whether 213,456<sum of assigned byte lengths ≤349,536 (step 1107 in FIG. 8). If Yes, set the rates of the first and second grant cycles to 1 Gbps and the rates of the third and fourth grant cycles to 10 Gbps (step 1108 in FIG. 8).

(D) Check whether 349,536<sum of assigned byte lengths ≤485,616 (step 1109 in FIG. 8). If Yes, set the rate of the first grant cycle to 1 Gbps and the rates of the second to fourth grant cycles to 10 Gbps (step 1110 in FIG. 8). If No, set the rates of all the grant cycles to 10 Gbps (step 1111 in FIG. 8).

(E) After the transmission rates of the grant cycles are determined, the data transmission permission unit 709 determines time slots for the data transmission of the ONUs in the grant cycle with reference to the byte lengths (902 in FIG. 10) stored in the byte length assignment table 802 and generates the corresponding values in the transmission timing table 803 (step 1112 in FIG. 8, an example operation will be described later in detail). In this step, the number of assigned bytes in the byte length assignment table is divided by 8 in the grant cycle using the transmission rate of 10 Gbps. As has been described with reference to FIG. 2, the timings in the Start field 28 and the End field 29 are specified in bytes at a transmission rate of 1 Gbps and in eight bytes at a rate of 10 Gbps, in this embodiment.

FIG. 9 is also an operation flowchart showing an example operation of the OLT control unit and shows an example operation in the transmission timing determination step 1112 (FIG. 8) in detail. The upstream signal transmission timing of each ONU is determined as follows.

(E1) Read the byte length assigned to a first ONU ID from the byte length assignment table 802 (step 1301). The first ONU ID in bandwidth assignment can always be the smallest ONU ID (usually 1), but in this embodiment, the first ONU ID is incremented by one (1→2→3→. . . ) in each DBA cycle. Since a higher transmission rate is likely to be assigned to a later grant cycle in the embodiment described with reference to FIG. 8, the ONU ID is incremented by one to prevent a specific ONU (having a great ID) from being given a high transmission rate consecutively and consequently using much power alone. An effective method other than incrementing the first ONU ID by one is to start assignment from an ONU ID chosen at random from all the ONU IDs in each DBA cycle.

(E2) Start calculation from a first row of the transmission timing table of the first grant cycle (step 1302). Check whether the rate in the grant cycle is 1G (step 1303). If No, the transmission rate is 10G, and the byte length is divided by 8 to obtain a byte value that gives the same time slot as at 1G in the subsequent calculation (step 1304). Round up decimal fractions obtained in the division by 8. Then, enter 12 in the Start field and write the value in the row of the target ONU ID (step 1305).

(E3) Check whether Start−1+byte length ≤19,439 (step 1306). If Yes, enter Start−1+byte length in the End field, and write the value in the row of the target ONU ID. Increment the target ONU ID by one, enter End+12+1 in the Start field, and write the Start value in the row of the new target ONU ID (step 1307).

(E4) If No in step 1306, enter 19,439 in the End field, and write the value in the row of the target ONU ID. Assign Start−1+Byte length−19,439 to the byte length (step 1308), and return to step 1303 to start calculation for the next grant cycle.

(E5) After repeating the steps described above, check whether calculation of all the ONU IDs has been completed (step 1309). If Yes, increment the value specified as the first ONU ID by one and store it for calculation in the next DBA cycle, and end this process. If No in step 1309, return to step 1306.

Through the operation as illustrated in the operation flow-charts in FIGS. 8 and 9, the transmission timing tables shown in FIG. 11 are created respectively from the byte length assignment tables shown in FIG. 10.

FIG. 11 shows example configurations of the transmission timing table 803, including an ONU ID 901, which is an identifier of the ONU, a Start field 1002 for holding a timing when data transmission starts in a grant cycle, an End field 1003 for holding a timing when data transmission ends, and a rate field 1004 for holding a signal transmission rate. The tables (a) to (e) in FIG. 11 correspond to the byte assignment tables (a) to (e) in FIG. 10, respectively. The tables show that through the operation that has been described with reference to the flowcharts in FIGS. 8 and 9, the signal transmission rate is adjusted in each grant cycle in accordance with the sum of assigned bytes, and the signal transmission timing (bandwidth) assignment is reassigned accordingly.

(3) The transmission timing determination unit 801 reports a data transmission timing by sending a transmission permission message that includes a grant indication field 22 (US bandwidth map) to the corresponding ONU 300 in accordance with the contents of the transmission timing table 803 (step 1113 in FIG. 8).

Each ONU 300 that has received the grant indication sends an upstream signal at the transmission timing and at the transmission rate specified by the OLT 200, as described earlier with reference to FIG. 5.

FIG. 12 illustrates how the upstream signal from each ONU is received by the OLT. The figure shows that the signals from the ONUs are optically time-division-multiplexed on the trunk optical fiber 110 in the order specified in the transmission timing table 803 and reach the OLT. The diagrams (a) to (e) in FIG. 12 correspond to the tables (a) to (e) in FIGS. 10 and 11 and show that the signal transmission rate in each grant cycle is changed in accordance with the sum of assigned bytes, and the signal transmission timing (bandwidth) is reassigned accordingly. The figure also shows that with the transmission rates specified in the first to fourth grant cycles in accordance with the sum of assigned bytes as described earlier, the maximum of the time slots from the first grant cycle to the fourth grant cycle is used, and low power consumption and improved transmission efficiency are provided in cases (a) to (e) differing in the sum of assigned bytes. Since the first ONU ID is incremented by one (1→2→3→...) in each DBA cycle, even if the byte length assignment is made as shown in (a) to (e) in FIG. 8 in that order, the rate of 1 Gbps with low power consumption is assigned to the all ONUs in turn, as shown in (a) to (e) in FIG. 12. This makes it possible to prevent any specific ONU from using much power.

The operation and configuration of a different type of the OLT control unit that reduces the power consumption of an ONU that makes few transmission requests by assigning the lowest possible transmission rate to the ONU that makes few transmission requests will be described below.

Figure 13:
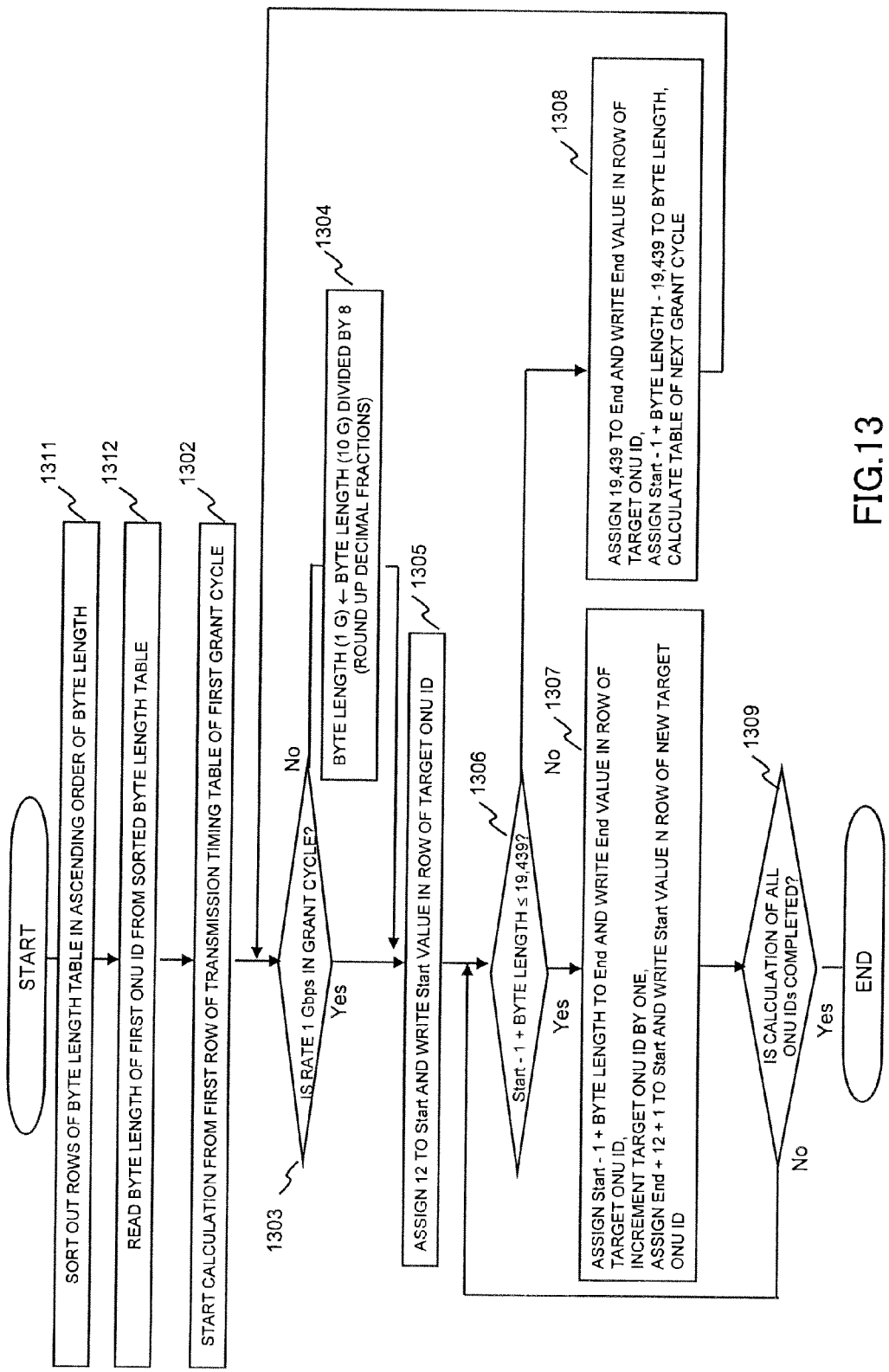
FIG. 13 is an operation flowchart illustrating a different example operation of the OLT control unit.

FIG. 13 is an operation flowchart illustrating a different example operation of the OLT control unit. The operation flowchart illustrates a different example of the transmission timing determination step (FIG. 9, step 1112 in FIG. 8). The flowchart differs from the flowchart in FIG. 9 in that a step (1311) of sorting out the rows of the byte length assignment table 802 in ascending order of byte length has been added. After the step, by starting calculation from the first ONU ID in the byte length assignment table (step 1312) as in the embodiment described earlier, the lowest possible transmission rate can be assigned to the ONU 300 that makes few transmission requests. This step causes the rate of 1 Gbps with lower power consumption to be assigned to an ONU with a smaller bandwidth assigned, making it easier for a subscriber with a smaller bandwidth assigned to save its power consumption.

Figure 16:
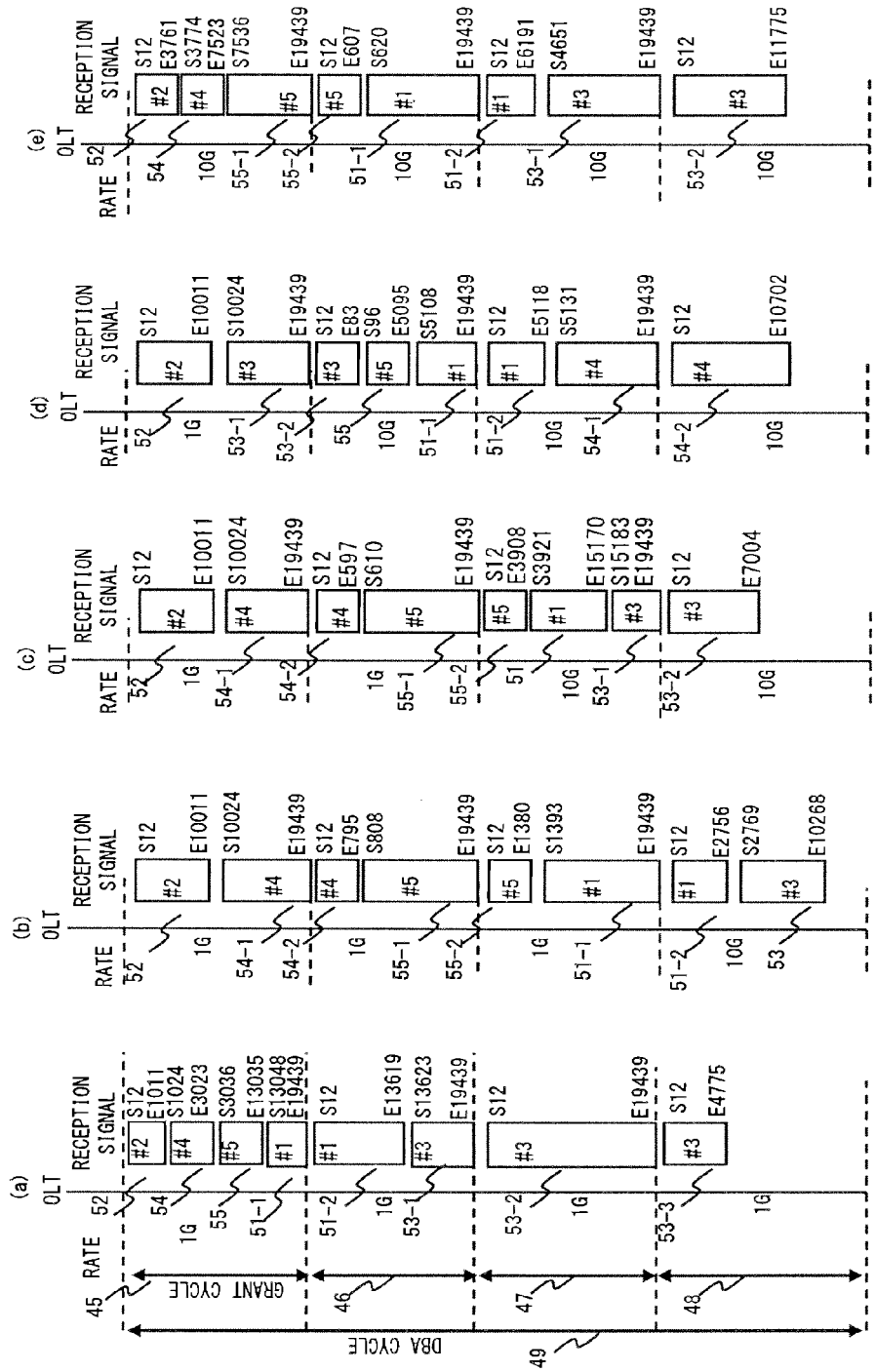
FIG. 16 is a view illustrating a different example operation to receive an upstream signal by the OLT.

FIG. 14 is a memory configuration diagram illustrating example configurations of the byte length assignment table sorted in step 1311, and the rows are arranged in ascending order of assigned bytes. If the operation as illustrated in FIG. 13 is implemented by using the byte length assignment table 802 in which ONU IDs are arranged in ascending order as in the embodiment described earlier (FIG. 10), an ONU ID to which the smallest bandwidth has been assigned must be found from the byte length assignment table before calculation for assigning a transmission timing is made, and then an ONU ID to which the second smallest bandwidth has been assigned must be found from the byte length assignment table before calculation for assigning a transmission timing is repeated. If the byte length assignment table 802' with rows arranged in ascending order of assigned bytes is created first as shown in FIG. 14, transmission timings should be assigned to the ONU IDs in order in which they are arranged in the table. Since steps for finding ONU IDs are eliminated, the efficiency of the transmission timing assignment operation can be improved. If the operation illustrated in the flowchart in FIG. 13 is performed with reference to the byte length assignment table 802, a transmission timing table 803' shown in FIG. 15 is created. By giving the contents to the ONUs 300, the OLT 200 will receive signals illustrated in FIG. 16.

In the embodiment described above, four grant cycles form a single DBA cycle, and the transmission rate is switched in each grant cycle. By forming a single DBA cycle with more grant cycles and by switching the transmission rate more frequently, a combination of transmission rates closest to the sum of bytes assigned to all the ONUs can be selected, and the entire power consumption can be minimized by reducing the transmission rate to the lowest possible level. By switching the transmission rate for each ONU, the same effect can be obtained.

In the PON of the present invention, the ONU can judge its transmission rate to be used in upstream communication. More specifically, the ONU has buffer memories with different levels of priority for holding temporarily the contents of upstream communication, and determines its upstream signal transmission rate as follows: if the amount of data in a high-priority buffer memory falls below the amount that can be transmitted at a rate of 1 Gbps at a timing indicated by a transmission timing control unit, the rate of 1 Gbps is used; if the amount of data exceeds the amount that can be transmitted at a rate of 1 Gbps, the rate of 10 Gbps is used. The configuration and operation will be described in detail with reference to figures.

Figure 17:
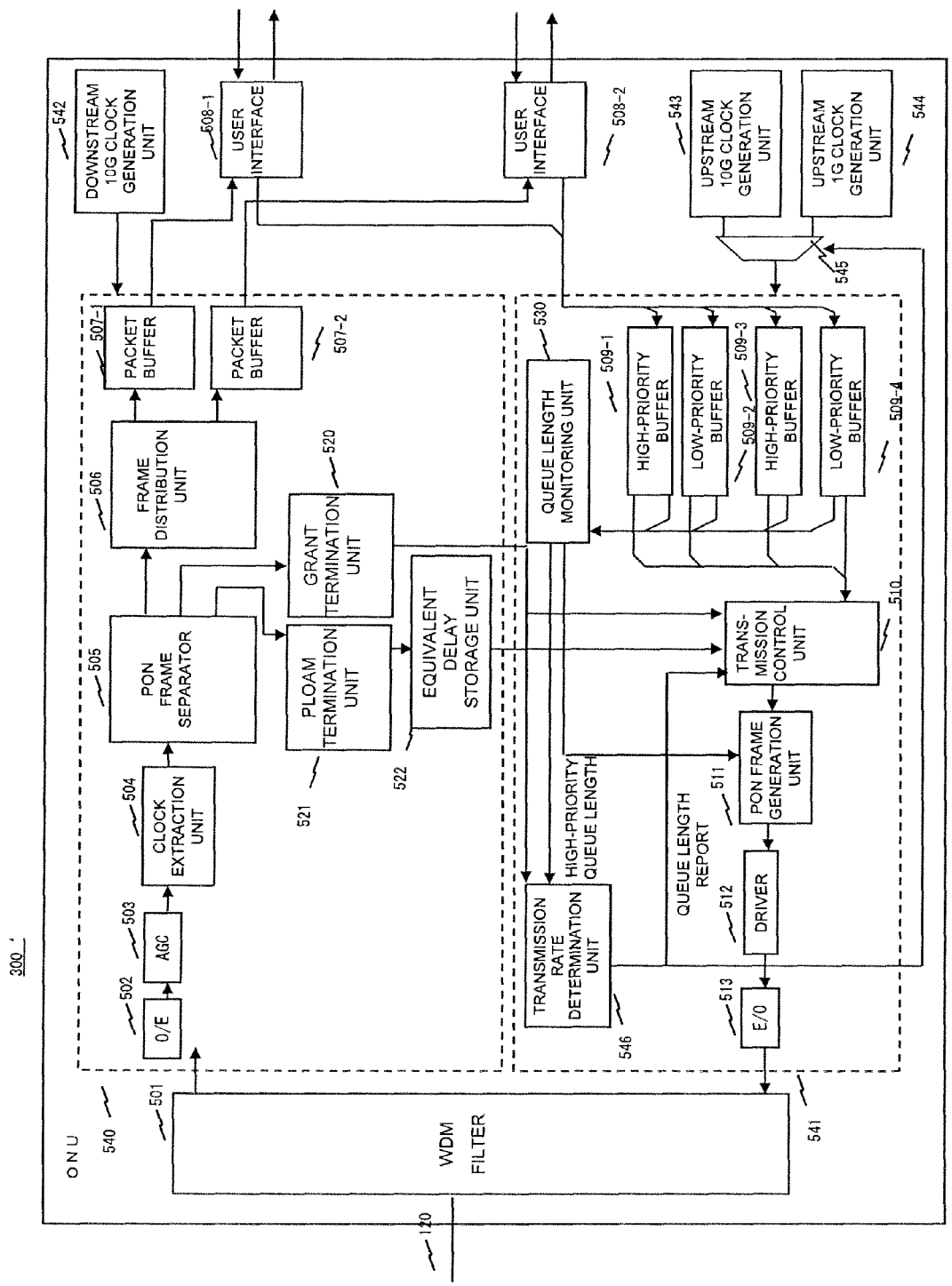
FIG. 17 is a block diagram illustrating a different example configuration of the ONU.
Figure 18:
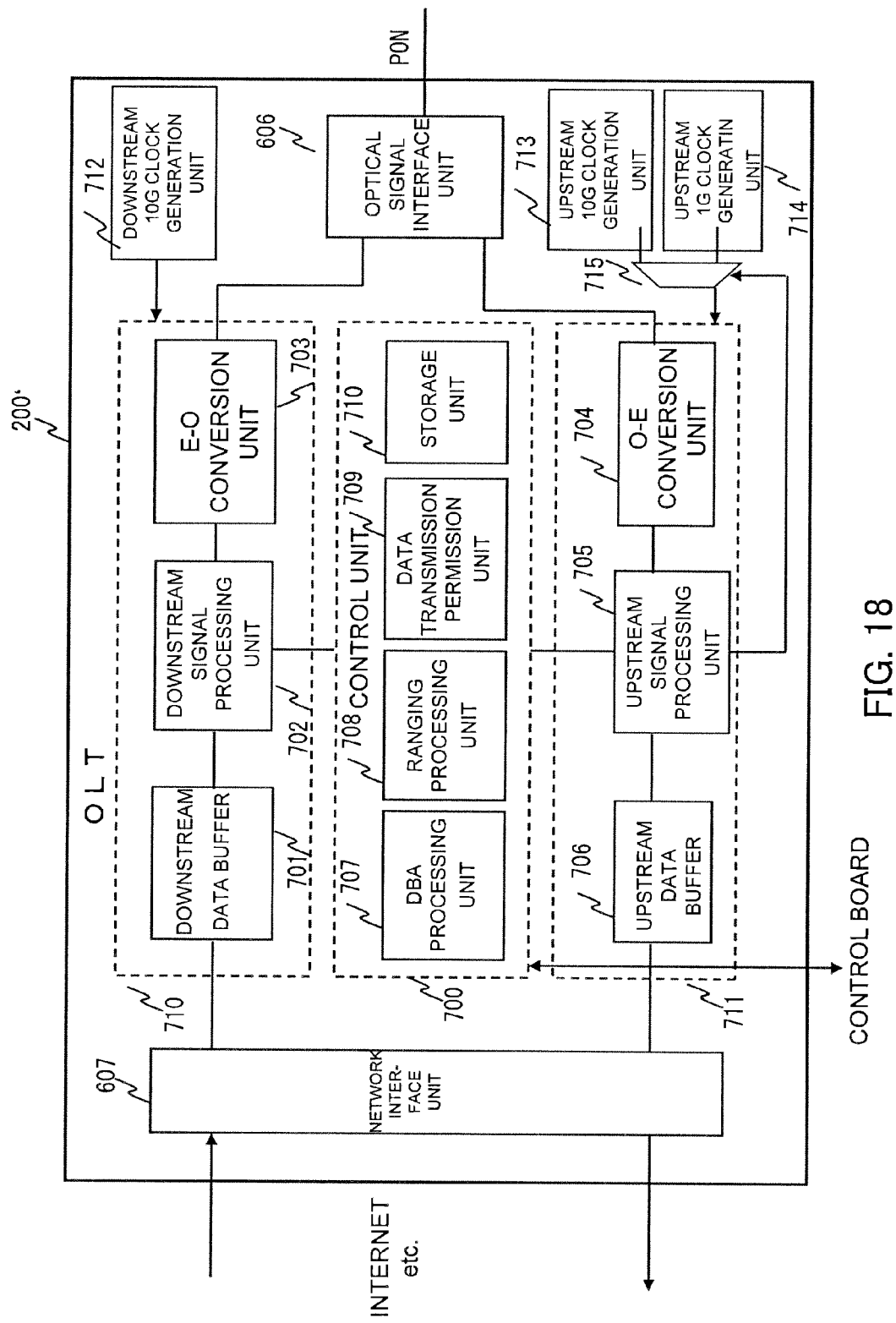
FIG. 18 is a block diagram illustrating a different example configuration of the OLT.

FIG. 17 is a block diagram illustrating a different configuration of the ONU used in the PON of the present invention. FIG. 18 is a block diagram illustrating a different configuration of the OLT. Those block diagrams show configurations for determining the upstream signal transmission rate by the ONU.

An ONU 300' differs from the ONU 300 described earlier in that it includes a transmission rate determination unit 546 and also in that the upstream transmission rate is determined on the basis of the outputs from the grant termination unit 520 and the queue length monitoring unit 530 and the selector 545 is controlled accordingly. The buffer 509 for holding the upstream signal temporality includes high-priority buffers and low-priority buffers for storing signals in accordance with the levels of priority of the signals. The transmission rate determination operation will be described later in detail.

An OLT 200' differs from the OLT 200 described earlier in that the selector 715 for selecting the transmission rate is controlled in accordance with the upstream signal received by the upstream signal processing unit 705. Since a signal having the upstream transmission rate determined by the ONU 300' is received, the upstream signal processing unit 705 analyzes the waveform to determine the transmission rate. The first information of the upstream signal is the preamble (30 in FIG. 3). The preamble uses a predetermined value, and an alternating 1 and 0 bit string, which is convenient especially for extracting a high speed clock signal, is used in many cases. When the upstream signal transmission rate is 1 Gbps, a single pulse width is about 803 picoseconds. When the upstream signal transmission rate is 10 Gbps, a single pulse width is about 100 picoseconds. Therefore, the upstream signal processing unit 705 can check the transmission rate easily by measuring the width of the preamble pulse of the received upstream signal.

Figure 19:
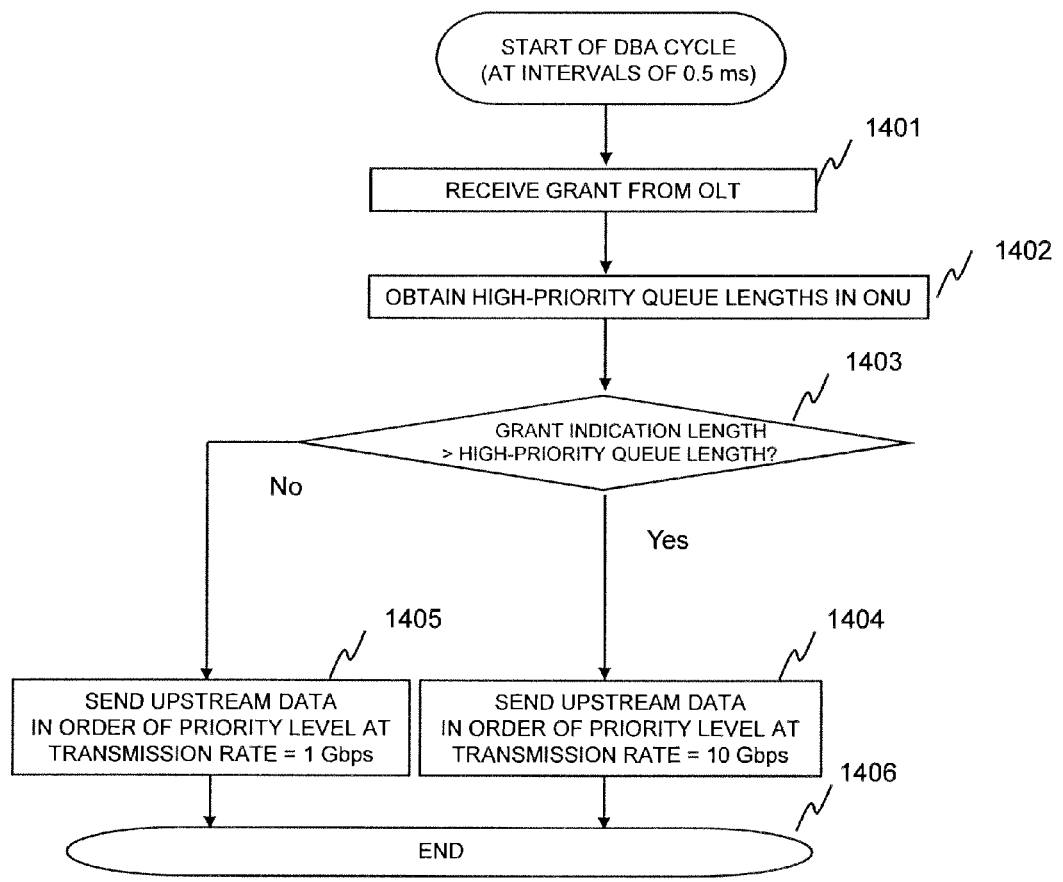
FIG. 19 is an operation flowchart illustrating an example operation of a transmission rate determination unit in the ONU.

FIG. 19 is an operation flowchart illustrating an example operation of the transmission rate determination unit 546 in the ONU. The upstream signal transmission rate is determined as follows.

(1) When a grant indication (22 in FIG. 2) is received from the OLT 200' in a DBA cycle (step 1401), the queue length monitoring unit 530 obtains the queue lengths of high-priority buffers 509-1 and 509-3 of the upstream buffer 509 and reports the values to the transmission rate determination unit 546 (step 1402).

(2) If the amount of data left in the high-priority buffers 509-1 and 509-3 falls below the amount of data that can be transmitted at a rate of 1 Gbps, in comparison with the timings (grant indication length) indicated by the transmission control unit 510 (if No in step 1403), the rate of 1 Gbps is used (step 1405). If the data amount exceeds the amount that can be transmitted at a rate of 1 Gbps (if Yes in step 1403), the rate of 10 Gbps is used (step 1404). In accordance with the result of determination, the transmission control unit 510 and the selector 545 are controlled.

FIG. 20 is a view illustrating an example operation of the ONU. This memory configuration diagram shows an example configuration of the upstream signal transmission control table provided in a memory (not shown) of the transmission control unit 510 in the ONU 300' after the transmission rate determination unit 546 operates. The memory may be provided in a function block other than the transmission control unit 510. For convenience of description, the memories provided for the ONUs are illustrated as a single one, but the individual ONUs just need to have their own data.

The information of a row corresponding to the ONU ID in the figure is used in a determination made by the transmission rate determination unit 546. For example, the permitted byte value 1005 of ONU ID 5 at a rate of 1 Gbps is 12,500 bytes, which is the difference between the values in the Start field 1002 and the End field 1003. The amount 1006 of data held in the high-priority queue in the ONU with ONU ID 5 is 10,000 bytes, and the amount 1007 of data held in the low-priority queue is 90,000 bytes. Since 10,000 bytes of data in the high-priority queue can be sent at 1 Gbps, as determined above, the ONU 5 sends the data at 1 Gbps and also sends 2,500 bytes of data in the data held in the low-priority queue at a 1 Gbps. Although the permitted byte value 1005 of the ONU 2 is 375 bytes, the amount 1006 of data held in the high-priority queue is 200 bytes. So, 200 bytes of data in the high-priority queue are sent at 1 Gbps, and 175 bytes of data in the data held in the low-priority queue are sent at 1 Gbps.

Figure 21:
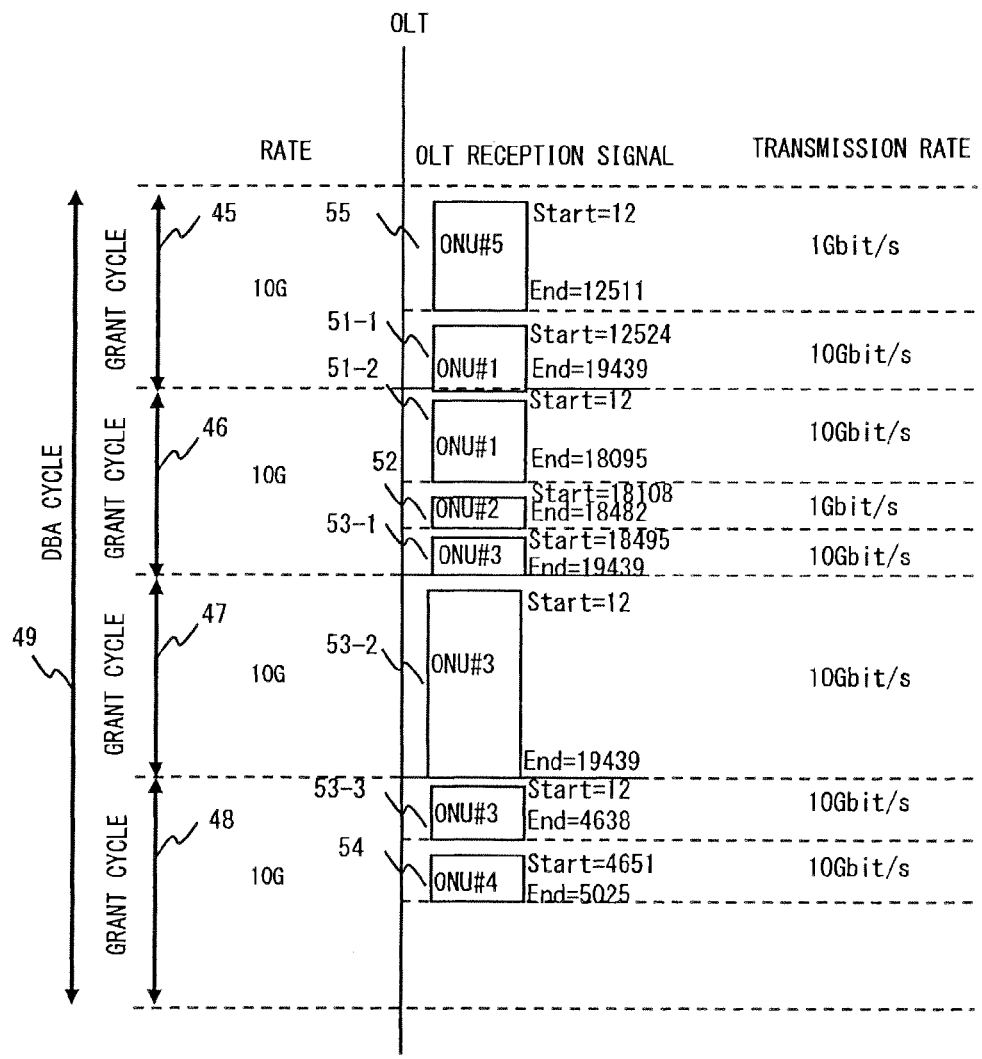
FIG. 21 is a view illustrating a different example operation to receive an upstream signal in the OLT.

FIG. 21 is a view illustrating a different example operation to receive the upstream signal in the OLT and shows how the OLT receives upstream signals time-division-multiplexed on the trunk optical fiber 110, sent from the ONUS, if the ONU has the information shown in FIG. 20.

If the ONUS are configured and operate to determine their transmission rates, as described above, the ONUS can select upstream signals to be sent. For example, the ONUs do not send all the data in the transmission queues but send high-priority data at a low transmission rate. In the current PON transmission standard stipulated in the ITU-T Recommendation G984.3, a mechanism for dividing the length of high-priority data in a queue and giving the divided length to the OLT is not specified. Therefore, the OLT cannot determine the transmission rate, taking the priority levels of data in transmission queues in each ONU into consideration. This becomes possible in this embodiment. In addition, each ONU can choose by itself to attach greater importance to demand for lower power consumption.

Reference Numerals

10: PON; 100: Splitter; 110, 120: Optical fibers; 130: Downstream signal, 140, 150: Upstream signals; 200: OLT; 300: ONU; 400, 410: Terminals, 700: Control unit; 707: DBA processing unit; 709: Data transmission permission unit; 801: Transmission timing determination unit; 802: Byte length assignment table; 803: Transmission timing table

The invention claimed is:

1. A passive optical network system, comprising:
a master station and a plurality of slave stations are connected by an optical fiber network comprising an optical splitter and a plurality of optical fibers;
wherein the master station is configured to determine the amount of signal to be transmitted from each of the plurality of slave stations to the master station and its transmission timing, in accordance with requests sent from the plurality of slave stations; and the master station is configured to receive signals from the plurality of slave stations through the optical fiber network;
wherein the master station comprises a control unit which is configured to determine on a constant cycle the amount of signal that each of the plurality of slave stations is permitted to send to the master station, its transmission timing, and its signal clock rate used for signal transmission, in accordance with the amount of signal transmission requested by each of the plurality of slave stations; and
wherein each of the plurality of slave stations comprises a control unit configured to send a signal to the master station at a first clock rate or a second clock rate which is higher than the first clock rate, and the control unit is configured to send the signal either at the first clock rate or the second clock rate, in accordance with a report sent from the master station,
wherein, when the control unit of the master station determines on the constant cycle the amount of signal that each of the plurality of slave stations is permitted to send, in accordance with the amount of signal requested by each of the plurality of slave stations, and when the amount of signal that the plurality of slave stations is permitted to send falls below the possible transmission amount in the constant cycle at the first clock rate, the control unit is configured to set the signal clock rate that the plurality of slave stations send to the first clock rate, and, when the amount of signal permitted to send exceeds the possible transmission amount in the constant cycle at the first clock rate, the control unit is configured to set the signal clock rate that at least one of the plurality of slave stations sends to the second clock rate.

2. A passive optical network system according to claim 1, wherein the constant cycle on which the control unit of the master station makes a determination is formed of a plurality of subcycles; and
the control unit is configured to set the signal clock rate that a given slave station uses for signal transmission in each of the subcycles to the first clock rate or the second clock rate, in accordance with a sum of the amounts of signal that each of the plurality of slave stations is permitted to send.

3. A passive optical network system according to claim 1, wherein the control unit of the master station comprises:
   a bandwidth control unit which is configured to determine the amount of signal that each of the plurality of slave stations is permitted to send to the master station on the constant cycle, in accordance with the amount of signal transmission requested by each of the plurality of slave stations; and
   a transmission timing control unit which is configured to determine the transmission timing and the signal clock rate of the slave station that sends the signal, in accordance with the determined amount of signal.

4. A passive optical network system according to claim 1, wherein information on the signal clock rate determined by the master station put in a control signal field that reports information on the transmission timing determined by the master station, in a frame signal sent from the master station to the plurality of slave stations, and is reported to each of the plurality of slave stations.

5. A passive optical network system, comprising:
   a master station and a plurality of slave stations are connected by an optical fiber network comprising an optical splitter and a plurality of optical fibers;
   wherein the master station is configured to determine an amount of signal to be transmitted from each of the plurality of slave stations to the master station and its transmission timing, in accordance with requests sent from the plurality of slave stations; and the master station is configured to receive signals from the plurality of slave stations through the optical fiber network;
   wherein the master station comprises a control unit which is configured to determine on a constant cycle the amount of signal that each of the plurality of slave stations is permitted to send to the master station, and its transmission timing, in accordance with the amount of signal transmission requested by each of the plurality of slave stations; and
   wherein each of the plurality of slave stations comprises a control unit is configured to send a signal to the master station at a first clock rate used for signal transmission to the master station or a second clock rate which is higher than the first clock rate, and the control unit is configured to select the first clock rate or the second clock rate in accordance with the permitted amount of signal transmission reported from the master station, and to send the signal accordingly,
   wherein, when the control unit of the master station determines on the constant cycle the amount of signal that each of the plurality of slave stations is permitted to send, in accordance with the amount of signal requested by each of the plurality of slave stations, and to report the amount to each of the plurality of slave station,
   when an amount of data waiting for sending to the master station falls below the possible transmission amount in the transmission timing reported from the master station at the first clock rate, the control unit of the slave station is configured to set a signal clock rate used for signal transmission to the first clock rate, and, when the amount of data exceeds a possible transmission amount in the transmission timing reported from the master station at the first clock rate, the control unit is configured to set a signal clock rate used for signal transmission to the second clock rate.

6. An operating method of a passive optical network system in which a master station and a plurality of slave stations are connected by an optical fiber network comprising an optical splitter and a plurality of optical fibers, the method comprising;
   determining by the master station an amount of signal to be transmitted from each of the plurality of slave stations to the master station and its transmission timing, in accordance with requests sent from the plurality of slave stations; and received by the master station signals from the plurality of slave stations through the optical fiber network;
   wherein, when the plurality of slave stations request the amounts of signal to be transmitted to the master station,
   determining by the master station on a constant cycle the amount of signal each of the plurality of slave stations is permitted to send, its transmission timing, and its signal clock rate used for signal transmission, in accordance with the amount of signal transmission requested by each of the plurality of slave stations, and reporting these information to each of the plurality of slave stations; and
   sending by each of the plurality of slave stations a respective signal to the master station at a first clock rate or at a second clock rate which is higher than the first clock rate, as reported from the master station,
   concerning the determining of the clock rate, when the amount of signal permitted to send falls below a possible transmission amount in the constant cycle at the first clock rate, setting the signal clock rate used for signal transmission to the first clock rate, and, when the amount of signal permitted to send exceeds the possible transmission amount in the constant cycle at the first clock rate, setting the signal clock rate used for signal transmission to the second clock rate.

7. An operating method of the passive optical network system according to claim 6, wherein the signal clock rate is determined by each of the plurality of slave stations.

* * * * *